US009657797B2

(12) United States Patent
Buxton et al.

(10) Patent No.: US 9,657,797 B2
(45) Date of Patent: May 23, 2017

(54) DISC BRAKE PAD FOR A VEHICLE

(71) Applicant: Federal-Mogul Motorparts Corporation, Southfield, MI (US)

(72) Inventors: Carl Richard Buxton, Cookeville, TN (US); Rodney G. Silvey, Cookeville, TN (US); Weiming Liu, Novi, MI (US)

(73) Assignee: Federal-Mogul Motorparts Corporation, Southfield, MI (US)

( * ) Notice: Subject to any disclaimer, the term of this patent is extended or adjusted under 35 U.S.C. 154(b) by 0 days.

(21) Appl. No.: 14/737,885

(22) Filed: Jun. 12, 2015

(65) Prior Publication Data
US 2016/0003317 A1 Jan. 7, 2016

Related U.S. Application Data

(60) Provisional application No. 62/090,187, filed on Dec. 10, 2014, provisional application No. 62/012,111, filed on Jun. 13, 2014.

(51) Int. Cl.
*F16D 69/00* (2006.01)
*F16D 65/092* (2006.01)

(52) U.S. Cl.
CPC ........... *F16D 69/00* (2013.01); *F16D 65/092* (2013.01); *F16D 2069/004* (2013.01)

(58) Field of Classification Search
CPC .... F16D 69/00; F16D 2069/004; F16D 65/04; F16D 65/092; F16D 2065/026
See application file for complete search history.

(56) References Cited

U.S. PATENT DOCUMENTS

| 4,501,347 | A | | 2/1985 | Cerny et al. |
| 5,117,949 | A | * | 6/1992 | Buckley .............. F16D 55/2262 188/250 B |
| 6,186,285 | B1 | | 2/2001 | Parsons |
| 6,234,284 | B1 | | 5/2001 | Ashman et al. |
| 6,279,222 | B1 | | 8/2001 | Bunker et al. |
| 6,478,130 | B2 | * | 11/2002 | Knueve .................. F16D 69/04 192/107 R |

(Continued)

FOREIGN PATENT DOCUMENTS

| CN | 202659785 U | 1/2013 |
| CN | 103016574 A | 4/2013 |

(Continued)

OTHER PUBLICATIONS

W. Liu and J. Pfeifer, "Reducing High Frequency Disc Brake Squeal by Pad Shape Optimization," SAE Technical Paper Series, SAE 2000 World Congress, Detroit, Michigan, Mar. 2000, 7 pages.

(Continued)

*Primary Examiner* — Anna Momper
(74) *Attorney, Agent, or Firm* — Reising Ethington P.C.

(57) ABSTRACT

A vehicle disc brake pad having a backing plate and a friction pad that includes a complex edge profile formed from a plurality of undulations on at least one side edge of the periphery. Each undulation includes a wave crest and a wave trough that extend toward and away from the periphery of the backing plate, respectively. The brake pad may provide improved thermal management and wear resistance, thereby improving the life span of the brake pad, particularly when used with heavier vehicles such as trucks, crossover vehicles, and sports utility vehicles.

19 Claims, 35 Drawing Sheets

(56) References Cited

U.S. PATENT DOCUMENTS

| | | |
|---|---|---|
| 7,275,625 B2 | 10/2007 | Oi et al. |
| D602,826 S | 10/2009 | Liu et al. |
| D622,646 S | 8/2010 | Arbesman et al. |
| D631,410 S | 1/2011 | Hiramori et al. |
| 8,151,433 B2 | 4/2012 | Liu et al. |
| 8,505,696 B2 | 8/2013 | Denys |
| 8,505,698 B2 | 8/2013 | Liu et al. |
| 8,689,421 B2 | 4/2014 | Liu et al. |
| 2006/0225975 A1 | 10/2006 | Pfaff |
| 2007/0119665 A1* | 5/2007 | Barbosa ............... F16D 65/092 188/73.45 |
| 2008/0169161 A1 | 7/2008 | Chern |
| 2009/0032343 A1 | 2/2009 | Liu et al. |
| 2009/0071766 A1 | 3/2009 | Gaulrapp et al. |

FOREIGN PATENT DOCUMENTS

| | | |
|---|---|---|
| CN | 203146666 U | 8/2013 |
| CN | 103591190 A | 2/2014 |
| CN | 103591198 A | 2/2014 |
| DE | 102004049559 A1 | 4/2006 |
| EM | 000143623-0001 | 2/2004 |
| JP | 2007071353 A | 3/2007 |
| WO | 9113268 | 9/1991 |
| WO | 02073059 A1 | 9/2002 |

OTHER PUBLICATIONS

International Search Report for corresponding to application No. PCT/US2015/035561, dated Sep. 21, 2015, 3 pages.
Written Opinion for corresponding to application No. PCT/US2015/035561, dated Sep. 21, 2015, 8 pages.

* cited by examiner

DISC BRAKE PAD FOR A VEHICLE

TECHNICAL FIELD

This invention generally relates to brake pads and, in particular, to disc brake pads for vehicles.

BACKGROUND

Disc brake pads are used in a variety of vehicles of varying size, including motorcycles, automobiles, and trucks, and generally include a backing plate and a friction pad attached to the backing plate. The size and shape of the brake pads, backing plates, and/or friction pads may vary depending upon such things as the size and/or weight of the vehicle with which they are used. Further, the size and shape of the friction pad may include features such as slots and/or notches for various reasons, one of which being a desire to reduce brake squeal. For example, as shown and described in U.S. Pat. No. 8,151,433 B2 and U.S. Pat. No. 8,505,698 B2, brake noise may be reduced by modifying the shape of conventional friction pads to include chamfers near the edges of the friction pads, various transverse slots in the friction pads, and U- or V-shaped notches.

Beyond brake noise, other performance issues arise with brake pads, including stopping power, stopping distance, wear resistance, manufacturability, thermal management, and driver pedal response. There is thus a continuing need to develop brake pads that address these and other performance characteristics of the pads in a way that can easily be adapted for different vehicle platforms.

SUMMARY

An object of the invention is to address at least some of the brake pad performance issues noted above.

According to one embodiment, there is provided a brake pad comprising a backing plate and a friction pad supported by the backing plate. The friction pad has a friction surface at least partially defined by a peripheral edge of the friction pad and having a peripheral sidewall extending between the peripheral edge and the backing plate. The peripheral edge comprises a plurality of peripheral side edges, and wherein at least one of the side edges includes a complex edge profile having a plurality of undulations.

In other embodiments, the brake pad of the preceding paragraph may include any one or more of the following features in any technically feasible combination:
  each undulation may include a wave crest and a wave trough that extend within a plane of the friction surface toward and away from a periphery of the backing plate, respectively;
  the backing plate may include a notch that corresponds in location with the wave crest or the wave trough of the undulation in the complex edge profile of the peripheral edge of the friction surface;
  the friction pad may include one or more curved grooves extending along the friction surface between one or more portions of the peripheral edge;
  the friction pad may include a curved groove that extends from a wave trough of one undulation to a wave trough of another undulation;
  the friction pad may include a curved groove that extends from a wave crest of one undulation to a wave crest of another undulation;
  the friction pad may include a curved groove that extends from a wave crest of one undulation to a wave trough of another undulation;
  friction surface may include one or more chamfered surfaces;
  the friction pad may have a non-elongated shape and a compactness between 0.0479 and 0.0578, inclusive;
  the friction pad may have a semi-elongated shape and a compactness between 0.0394 and 0.0495, inclusive;
  the friction pad may have an elongated shape and a compactness between 0.0330 and 0.0470, inclusive;
  a ratio of the area of the friction surface to the area of the peripheral sidewall may be between 1.18:1 and 2.49:1, inclusive;
  the peripheral edge of the friction pad may include a complex edge profile that includes between 4 and 13 undulations, inclusive; and/or
  the peripheral edge of the friction pad may include a complex edge profile that includes between 7 and 9 undulations, inclusive.

According to another embodiment, there is provided a friction pad comprising a friction surface a peripheral edge including a top peripheral side edge, a bottom peripheral side edge, a left peripheral side edge, and a right peripheral side edge that together form the peripheral edge. The friction pad further comprises a complex edge profile on at least one of the peripheral side edges of the friction surface. The complex edge profile includes a plurality of undulations. The friction pad further comprises one or more curved grooves extending along the friction surface between two different ones of the peripheral side edges.

In other embodiments, the friction pad of the preceding paragraph may include one or more of the following features in any technically feasible combination:
  the left and right peripheral side edges each may include at least a portion of one or more complex edge profiles, and one or more undulations of the left peripheral side edge may mirror the one or more undulations of the right peripheral side edge;
  the top peripheral side edge may include at least a portion of a complex edge profile and the top peripheral side edge may include more undulations than any other peripheral side edge of the friction surface; and/or
  the bottom peripheral side edge may include at least a portion of a complex edge profile and the bottom peripheral side edge may include more undulations than any other peripheral side edge of the friction surface.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE ILLUSTRATED EMBODIMENTS

The friction pad embodiments disclosed herein may be used in various disc brake pad designs and in various vehicle applications to help improve the stopping power and wear performance of the brake pad. The disclosed friction pads may be better suited for heavier vehicles, including but not limited to, trucks, crossover vehicles, and sports utility vehicles, to cite a few examples. The size and shape of the friction pad can be modified to impart a variety of benefits, including a reduction in brake noise, a reduction in stopping distance, a reduction in rotor wear and low wheel dust, optimal NVH (noise, vibration, and harshness) performance, and a lower and more consistent compression which correspond with an improved pedal response and a more consistent overall pad performance. In addition, the presently disclosed friction pad may help extend the useful life of the brake pad, for example, by improving the thermal management of the brake pad. More specifically, it has been shown that improved cooling efficiency can double the life of the brake pad in heavy loaded conditions compared with prior art brake pads.

Figure 1:
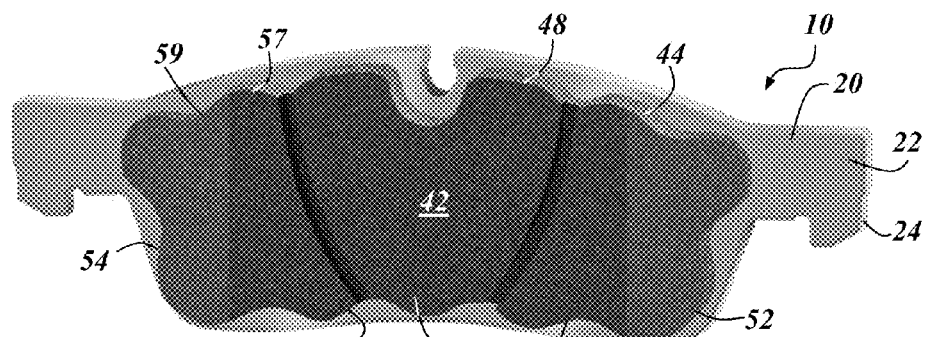
FIGS. 1-9 illustrate multiple friction pads having a complex edge profile according to various embodiments of the present disclosure, which may be attached to a backing plate to form a disc brake pad for a vehicle.
Figure 2:
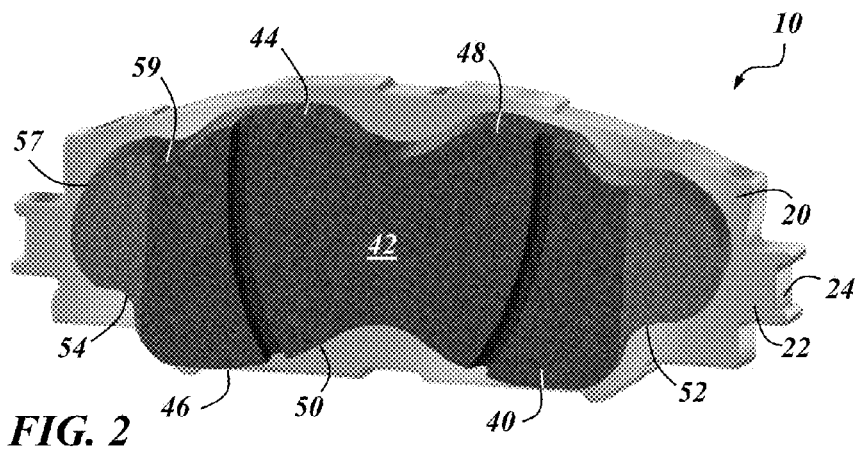
Figure 3:
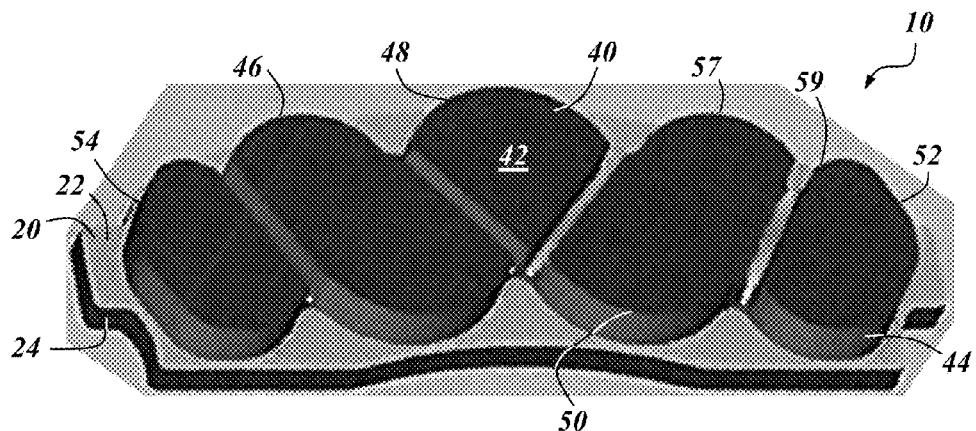

Referring generally to FIGS. 1-3, there is shown a disc brake pad 10. The brake pad 10 includes a backing plate 20 and a friction pad 40. The backing plate 20 includes a front face 22 and a periphery 24. The friction pad 40 is attached to the front face 22 of the backing plate 20 and includes a friction surface 42 facing away from the backing plate 20, a peripheral sidewall 44, and a peripheral edge 46 comprising top, bottom, and right and left peripheral side edges 48, 50, 52, 54. In at least a central region of friction pad 40, the friction surface 42 is planar, and the peripheral edge 46 lies within the same plane as the surface 42. The portion or length of the peripheral edge 46 that is in the same plane as the friction surface 42, and thus is pressed into contact with a brake rotor during braking, may be referred to as a contact edge of the friction pad 40.

The peripheral edge 46 of the friction pad 40 includes at least one complex edge profile 55. The complex edge profile 55 provides an increased surface area of the peripheral sidewall 44 while maintaining a generally planar friction surface. Similarly, it provides an increased peripheral length of the contact edge 46 compared to prior designs. The complex edge profile 55 may follow an undulating, scalloped or wave-like path, and may be incorporated into any or all of the peripheral side edges 48, 50, 52, 54 of the pad 40 or into just a portion of any of these side edges 48, 50, 52, 54.

In accordance with one embodiment, the complex edge profile 55 includes one or more undulations, each undulation including one wave crest 57 and one wave trough 59. the crests 57 and troughs 59 generally extend within the plane of the friction surface 42 toward and away from the periphery 24 of the backing plate 20, respectively, and conversely, generally extend away from and toward the geometric center or other central region of friction surface 42, respectively. The embodiments illustrated in FIGS. 1-3 include a plurality of undulations in their complex edge profiles; however only one undulation (e.g., one wave crest 57 and one wave trough 59) is designated for clarity purposes. The amplitude or height of the wave crests and the wave troughs of the peripheral edge 46 may be the same as or different from one another. Also, the frequency of the wave crests and/or troughs along the peripheral edge 46 of the friction pad 40 may vary among embodiments, and more particularly, may be different between the top, bottom, left, and right peripheral side edges 48, 50, 52, 54 of the pad 40, as will be described in more detail below. In some embodiments, the complex edge profile 55 along the peripheral edge 46 of the friction pad 40 may be generally or mathematically sinusoidal in shape. In other embodiments, the complex edge profile 55 may incorporate irregular shapes. Further, the peripheral edge 46 of the friction pad 40 may include one or more generally straight portions, which may form the undulations themselves or may form connections between one or more complex edge profiles 55 of the peripheral edge 46.

Figure 4A:
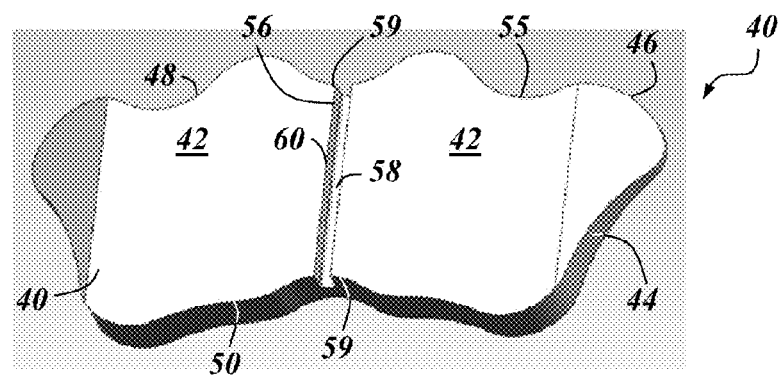
Figure 4B:
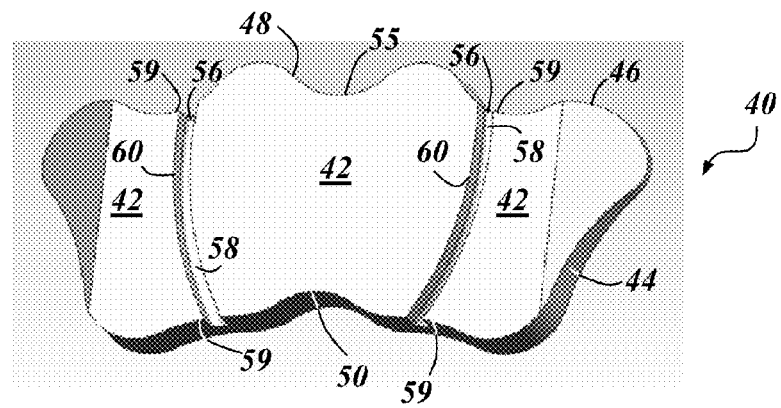
Figure 4C:
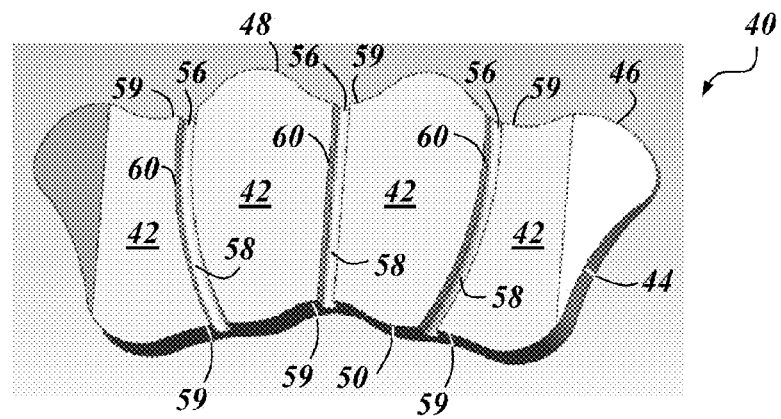

FIGS. 4A-4C show a friction pad 40 having a common complex edge profile 55, but with various groove configurations that may be included to facilitate cooling of friction pad and/or dust removal. One or more slots or grooves 56 may be formed in the friction pad 40, and may extend from the friction surface 42 of the pad 40 into an interior portion of the pad. The grooves 56 also may extend across the friction pad 40, from one side of the pad 40 to another. For example, the grooves may extend from the top peripheral edge 48 of the pad 40 to the bottom peripheral edge 50 of the pad to form a plurality of friction surfaces 42, and the grooves may follow a generally straight, curved, S-shaped, or other path. The grooves 56 may extend in a substantially vertical direction, or they may extend across the pad 40 at an oblique angle relative to a vertical axis. In a preferred embodiment, such as that shown in FIGS. 4A-4C, the grooves start and/or terminate in a wave trough 59 of the complex edge profile 55.

The grooves 56 may define interior wall surfaces 58 and interior edges 60 in the friction pad 40. The interior edges 60 may be located in the same plane as the friction surface 42 of the friction pad 40, and thus may come into contact the brake rotor during braking. As such, the grooves 56 in the friction pad 40 may increase the overall edge contact length of the friction pad 40. In one particular embodiment, the grooves are 0.18 inches wide and have a 0.2 inch depth that extends into the surface of the friction pad toward the backing plate. The grooves 56 may be molded in, or formed in a secondary operation in which a partially or fully formed friction pad 40 is routed or otherwise grooved along a desired path. CNC routing of the grooves 56 is one such method. The curved grooves 56 may follow a mathematically defined curved path, such as a simple sinusoidal or more complex curve defined by a polynomial, curve fit, or other formula or numerically specified path.

Figure 5:
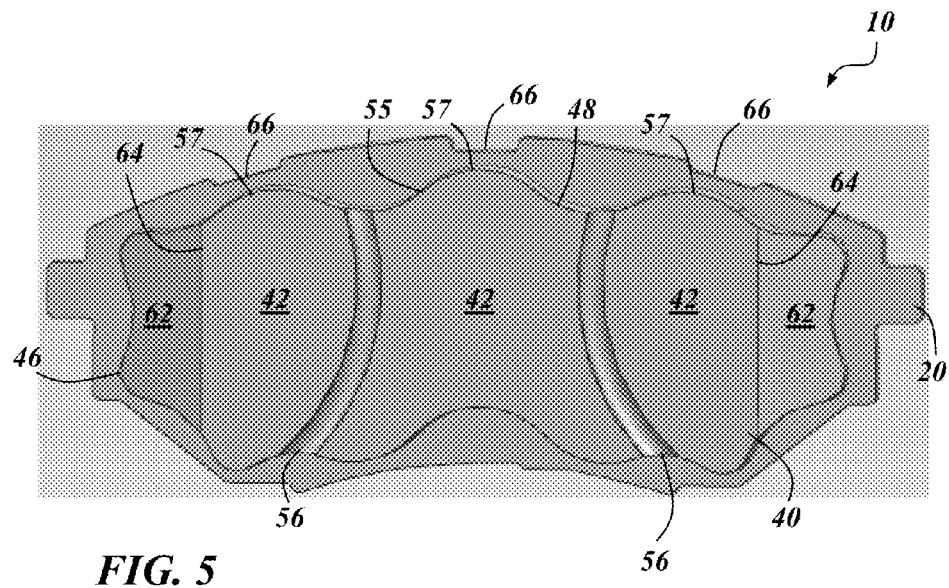
Figure 6:
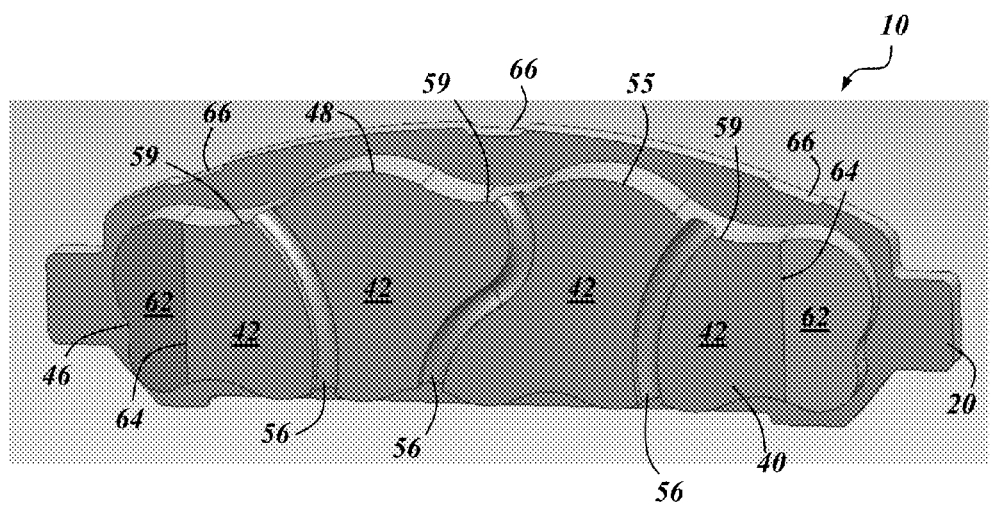
Figure 7:
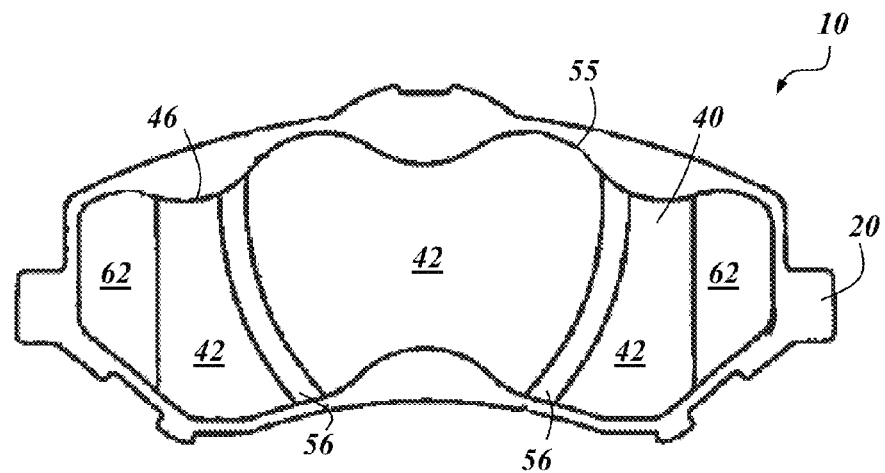
Figure 8:
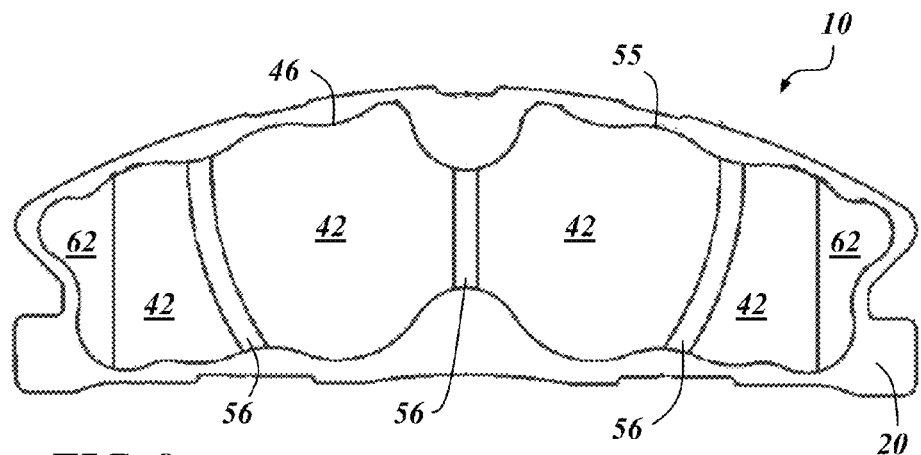
Figure 9:
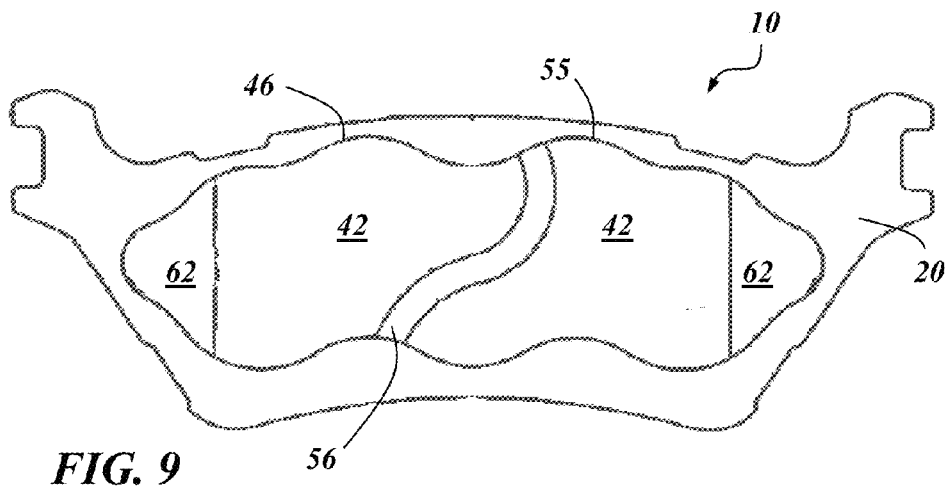

With particular reference to FIGS. 5 and 6, the friction surface 42 of the friction pad 40 also may include one or more chamfered surfaces 62, which may be flat or curved surfaces. The chamfered surfaces 62 may extend from the friction surface 42 of the friction pad 40 toward the backing plate 20. For example, the chamfered surfaces 62 may extend from the primary friction surface 42 of the friction pad 40 toward the peripheral edge 46 of the pad 40 or toward an interior portion of the pad 40. As such, the chamfered surfaces 62 may form one or more additional contact edges 64 at the friction surface 42 of the friction pad 40. FIGS. 5 and 6 further illustrate notches 66 in the periphery 24 of the backing plate 20. The notches may coincide with features of the complex edge profile (i.e., the notches and profile features are generally situated along the same point in their respective peripheries). For example, as shown in FIG. 5, the notches 66 coincide with wave crests 57 in the complex edge profile 55 of the top edge 48 of the pad 40. In FIG. 6, however, the notches 66 coincide with the wave troughs 59 in the complex edge profile 55 of the top edge 48. The notches 66 may be angular in shape, as shown, or may have a more arcuate appearance. Other combinations and respective placements of backing plate features are certainly possible.

In at least some embodiments, as shown generally in FIGS. 1-9, the friction pad 40 utilizes a combination of (1) a complex edge profile 55 along all or a part of the peripheral edge 46 of the friction pad 40 and (2) at least one curved groove that defines two or more friction surfaces 42. Straight grooves may be used as well in combination with the undulating peripheral edge 46 and/or the curved groove(s). And, in at least some embodiments, the backing plate 20 has a periphery 24, and the peripheral edge 46 of the friction pad 40 includes a plurality of undulations, and more particularly, wave crests and troughs that run adjacent the periphery 24 of the backing plate 20. Further, in at least other embodiments, the friction surface 42 includes one or more of the chamfered surfaces 62, with the peripheral edge 46 of the friction pad 40 having a complex edge profile 55 at the chamfered surfaces 62 that can be used in combination with any of the other above-noted features.

FIGS. 10-50 provide examples of complex edge profiles and ways in which the different edge profiles may be categorized and/or defined based at least partially on the overall size of the brake pad. An advantage of the disclosed embodiments is that a complex edge profile may provide an increased edge contact length of the friction pad 40 and increased surface area of the peripheral sidewall 44, for example, due to the undulations in the complex edge profile 55 of the peripheral edge 46 of the friction pad 40 and/or the curved shape of the grooves 56. This can improve brake performance. Thermal management of the friction pad 40 during braking may be improved as well, and this may be the result of turbulent air flow patterns created by the complex edge profile and grooves. Also, the complex edge profile 55 of the friction pad 40 may improve production by providing a more complete and uniform curing of the friction pad 40 during manufacturing, as a result of the increased amount of mold surface contact with the friction pad material along its peripheral edge.

In summary, the complex edge profiles of FIGS. 10-50 may be categorized and/or defined based on the area of the friction surface 42 (which may include chamfer areas 62), the area of the peripheral sidewall 44, the compactness of the pad shape, as well as the overall size and shape of the pad 40. The overall size and shape of the different brake pad embodiments can impact the degree to which the number and size of undulations in a complex edge profile add to the area of the peripheral side wall 44 and the length of the peripheral edge 46, and accordingly, as will be discussed in more detail below, the example friction pads illustrated in FIGS. 10-50 are split between non-elongated pads (FIGS. 10-15), semi-elongated pads (FIGS. 16-43), and elongated pads (FIGS. 44-50). The figures may not all be to scale, and as such, example measurements will be provided so that a skilled artisan can appreciate and ascertain the scope of the various dimensional relationships.

One metric that may be used to categorize and/or define complex edge profiles is compactness. Compactness is defined as the relationship between the area of the friction surface 42 (including chamfer areas 62 and any potentially illustrated groove areas) and the length of the peripheral edge 46. Compactness is a scale invariant feature. Because the perimeter of a component increases linearly with an increase of scale while the area increases quadratically, compactness is given as the ratio of the area to the square of the perimeter, as shown below:

$$\text{Compactness} = \frac{\text{Area}}{\text{Perimeter}^2}$$

Compactness is closely related to the circularity of a shape—being directly proportional by a factor of $4\pi$. Therefore, in an extreme example, a component having a low compactness and an accordingly low circularity will typically have long thin tendrils that spread across a fairly large region of space. Thus, a more undulating complex edge profile will result in a lower compactness, while the same friction pad with a non-undulating edge profile will have a higher compactness.

Because the overall size of the friction pad impacts the compactness (i.e., a more elongated pad will oftentimes have a lower compactness than a more square-shaped pad), the example pads illustrated in FIGS. 10-50 are split between non-elongated friction pads (FIGS. 10-15), semi-elongated friction pads (FIGS. 16-43), and elongated friction pads (FIGS. 44-50). As illustrated in the figures and described in detail below, non-elongated friction pads have a length to height ratio (l:h) of 2:1 or less, and typically no less than 1:1. Semi-elongated friction pads have a length to height ratio (l:h) greater than 2:1 and less than 3:1. Elongated friction pads have a length to height ratio (l:h) of 3:1 or greater, and typically no greater than 5:1. In order to determine the length to height ratio (l:h), the length l may be measured at the longest point along the length of the friction pad, and the height h may be measured at the tallest or widest point of the friction pad. FIGS. 10-50 are generally ranked in order from the smallest length to height ratio (l:h) to the largest. It should be understood that while the amount of elongation may affect the compactness, certain factors such as the friction surface area to peripheral sidewall area ratio or the number of undulations in the complex edge profile, may not be impacted by the amount of elongation in the overall shape of the friction pad.

In addition to compactness, the friction pads may also be categorized/and or defined by the ratio of the friction surface area 42 (including any chamfer areas 62 and any potentially illustrated groove areas) to the peripheral sidewall area 44. Finally, the complex edge profile itself may be grouped by the number of undulations included along the length of the peripheral edge 46, each undulation including a wave crest 57 and a wave trough 59. By adjusting the size and/or shape parameters of the friction pad to generally conform with the specific examples described below, a complex edge profile can impart the above-described benefits such as improved thermal management and wear resistance. However, it should be understood that the complex edge profile and/or the type and number of grooves can vary from the illustrated embodiments while still resulting in the disclosed benefits, and may be customized depending on the particular brake pad application and the requisites of the braking system. Moreover, the precise measurements provided herein are merely meant as examples. Finally, certain reference numerals have been omitted from FIGS. 10-50 for clarity purposes, but skilled artisans will recognize similar features based on the disclosure provided in conjunction with FIGS. 1-9.

Figure 10:
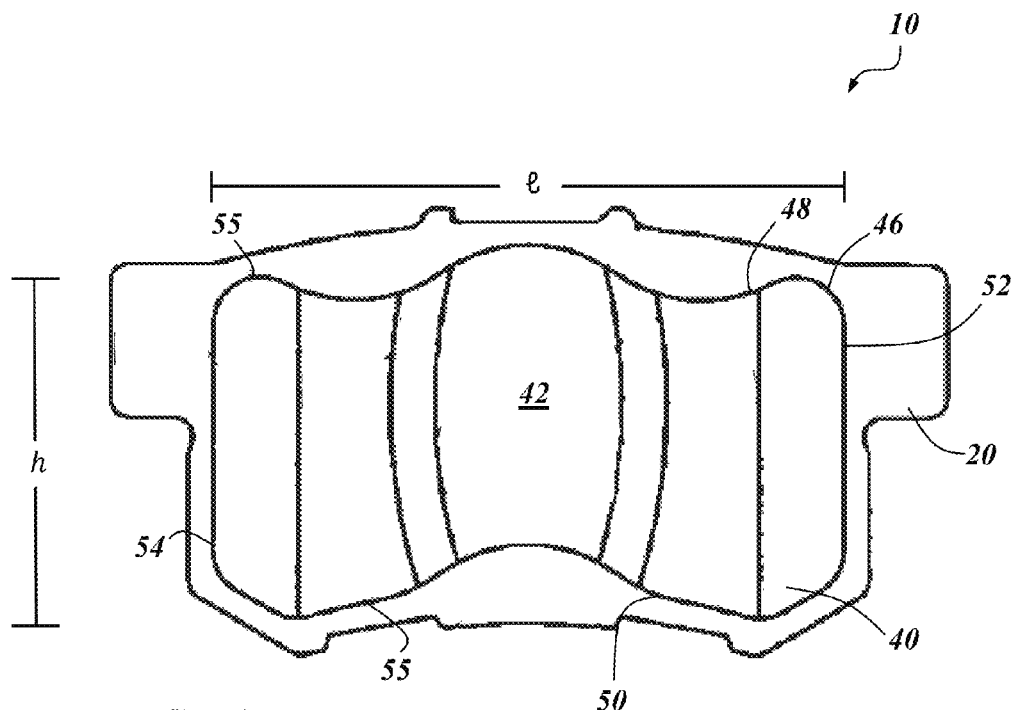
FIGS. 10-15 show multiple embodiments of friction pads with a non-elongated shape and including various complex edge profiles.

FIGS. 10-15 illustrate non-elongated friction pads, which have a length to height ratio (l:h) of 2:1 or less, and typically no less than 1:1. FIG. 10 shows a friction pad 40 which may have a length of 2.63 in. and a height of 1.564 in., and thus a corresponding length to height ratio (l:h) of 1.68:1. The area of the friction surface 42 may be 3.385 in.$^2$ and the length of the peripheral edge 46 may be 7.902 in., and the corresponding compactness is 0.0542. The complex edge regions 55 of the friction pad 40 shown in FIG. 10 include 2.5 undulations in the top peripheral edge 48 and 1.5 undulations in the bottom edge 50 for a total of 4 undulations along its peripheral length 46. Straight peripheral edges 52, 54 connect the two complex edge regions 55. Although not illustrated in the figure, the area of the peripheral sidewall in this embodiment may be 1.747 in.$^2$, which results in a friction surface area to peripheral sidewall surface area ratio of 1.94:1.

Figure 11:
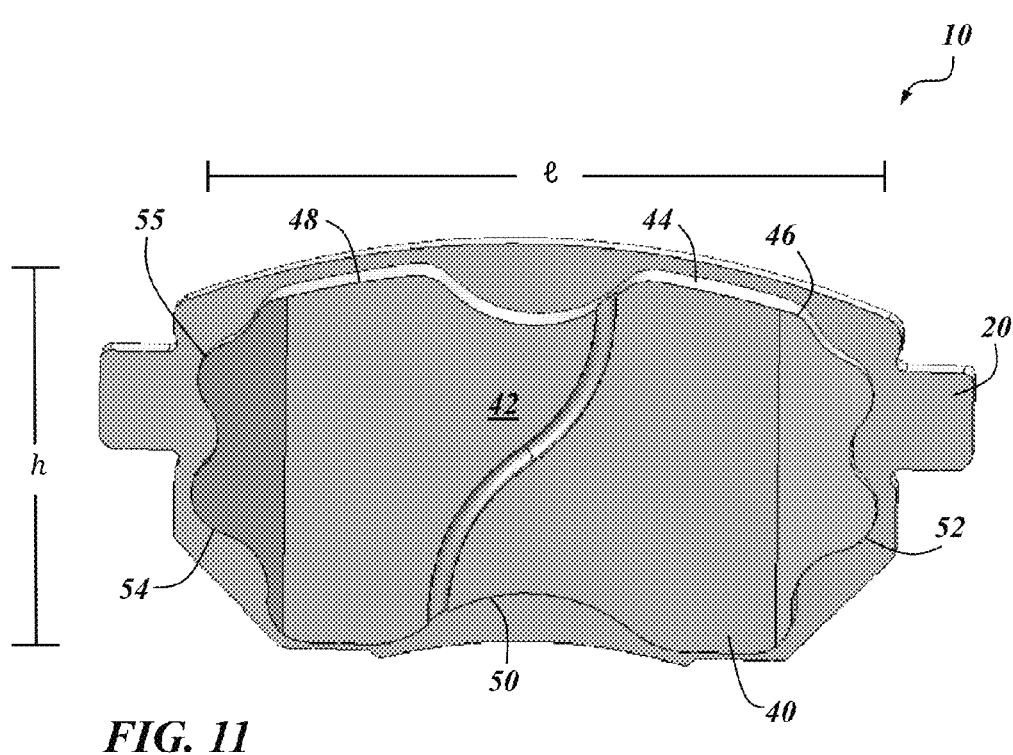

FIG. 11 shows a friction pad 40 which may have a length of 4.193 in. and a height of 2.317 in., and thus a corresponding length to height ratio (l:h) of 1.81:1. The area of the friction surface 42 may be 7.774 in.$^2$ and the length of the peripheral edge 46 may be 11.877 in., and the corresponding compactness is 0.0551. The complex edge region 55 of the friction pad 40 shown in FIG. 11 includes 1.5 undulations in the top peripheral edge 48, 1.5 undulations in the bottom edge 50, and 2.5 undulations in each side edge 52, 54 for a total of 8 undulations along its peripheral length 46. The undulations in the side edge 52 mirror the undulations in the other side edge 54. The area of the peripheral sidewall 44 in this embodiment may be 3.120 in.$^2$, which results in a friction surface area to peripheral sidewall surface area ratio of 2.49:1.

Figure 12:
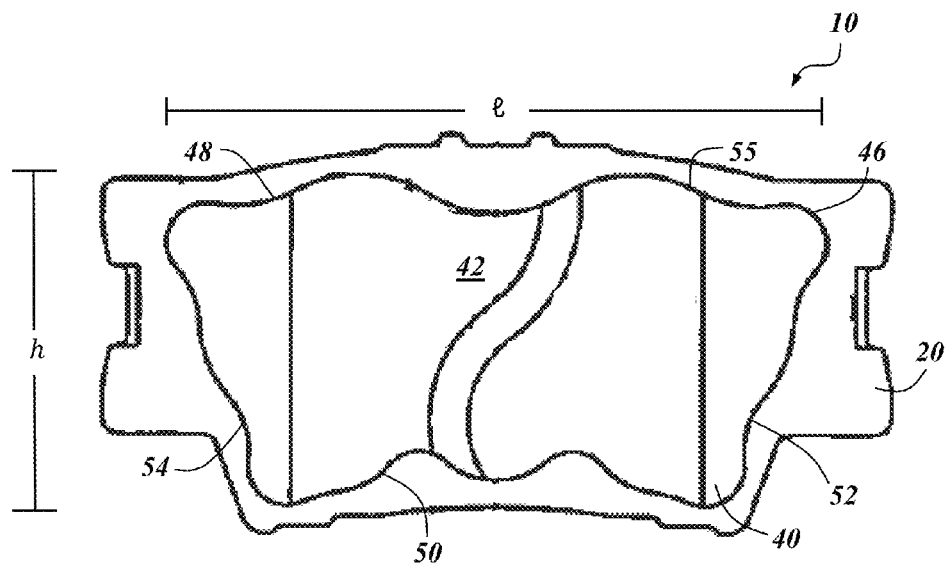

FIG. 12 shows a friction pad 40 which may have a length of 3.179 in. and a height of about 1.672 in., and thus a corresponding length to height ratio (l:h) of 1.90:1. The area of the friction surface 42 may be 3.864 in.$^2$ and the length of the peripheral edge 46 may be 8.703 in., and the corresponding compactness is 0.0510. The complex edge region 55 of the friction pad 40 shown in FIG. 12 includes 2.5 undulations in the top peripheral edge 48, 4.5 undulations in the bottom edge 50, and 2 undulations in each side edge 52, 54 for a total of 11 undulations along its peripheral length 46. The undulations in the side edge 52 mirror the undulations in the other side edge 54. The same pad was designed without a complex edge region and no undulating edge, and the compactness was accordingly much higher (0.0607). Although not illustrated in the figure, the area of the peripheral sidewall in this embodiment may be 2.606 in.$^2$, which results in a friction surface area to peripheral sidewall surface area ratio of 1.48:1.

Figure 13:
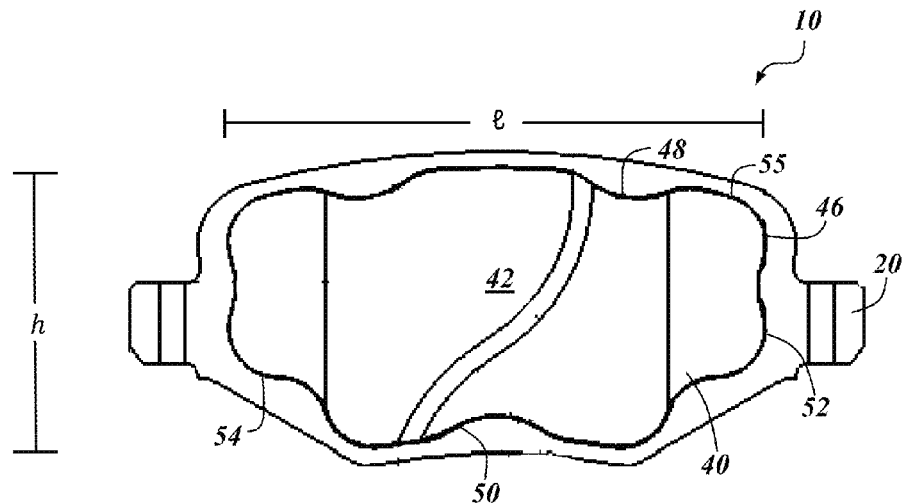

FIG. 13 shows a friction pad 40 which may have a length of 3.363 in. and a height of about 1.767 in., and thus a corresponding length to height ratio (l:h) of 1.90:1. The area of the friction surface 42 may be 4.785 in.$^2$ and the length of the peripheral edge 46 may be 9.099 in., and the corresponding compactness is 0.0578. In comparison with FIG. 12 which has the same length to height ratio, the compactness is larger for the FIG. 13 embodiment, most likely because the FIG. 12 embodiment has more undulations. The complex edge region 55 of the friction pad 40 shown in FIG. 13 includes 1.5 undulations in the top peripheral edge 48, 1.5 undulations in the bottom edge 50, and 2 undulations in each side edge 52, 54 for a total of 7 undulations along its peripheral length 46. The undulations in the side edge 52 mirror the undulations in the other side edge 54. Although not illustrated in the figure, the area of the peripheral sidewall in this embodiment may be 3.064 in.$^2$, which results in a friction surface area to peripheral sidewall surface area ratio of 1.56:1.

Figure 14:
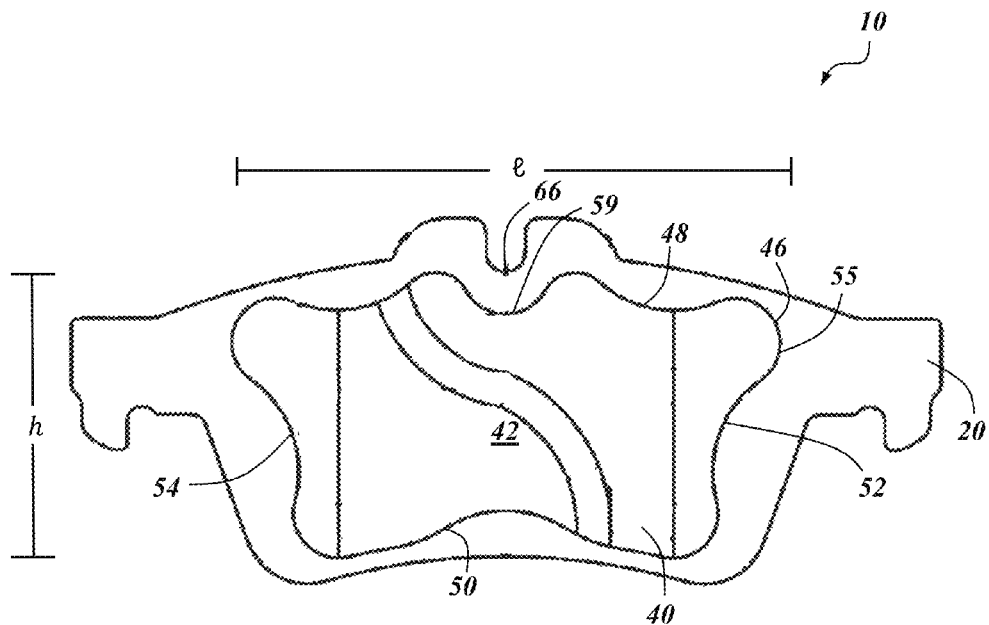

FIG. 14 shows a friction pad 40 which may have a length of 3.054 in. and a height of about 1.593 in., and thus a corresponding length to height ratio (l:h) of 1.92:1. The area of the friction surface 42 may be 3.490 in.$^2$ and the length of the peripheral edge 46 may be 8.539 in., and the corresponding compactness is 0.0479. The complex edge region 55 of the friction pad 40 shown in FIG. 14 includes 2.5 undulations in the top peripheral edge 48, 2.5 undulations in the bottom edge 50, and 1.5 undulations in each side edge 52, 54 for a total of 8 undulations along its peripheral length 46. The undulations in the side edge 52 mirror the undulations in the other side edge 54. The backing plate 20 also includes a notch 55 that corresponds in location to the wave trough 59 in the undulation in the top peripheral edge 48. Although not illustrated in the figure, the area of the peripheral sidewall in this embodiment may be 2.641 in.$^2$, which results in a friction surface area to peripheral sidewall surface area ratio of 1.32:1.

Figure 15:
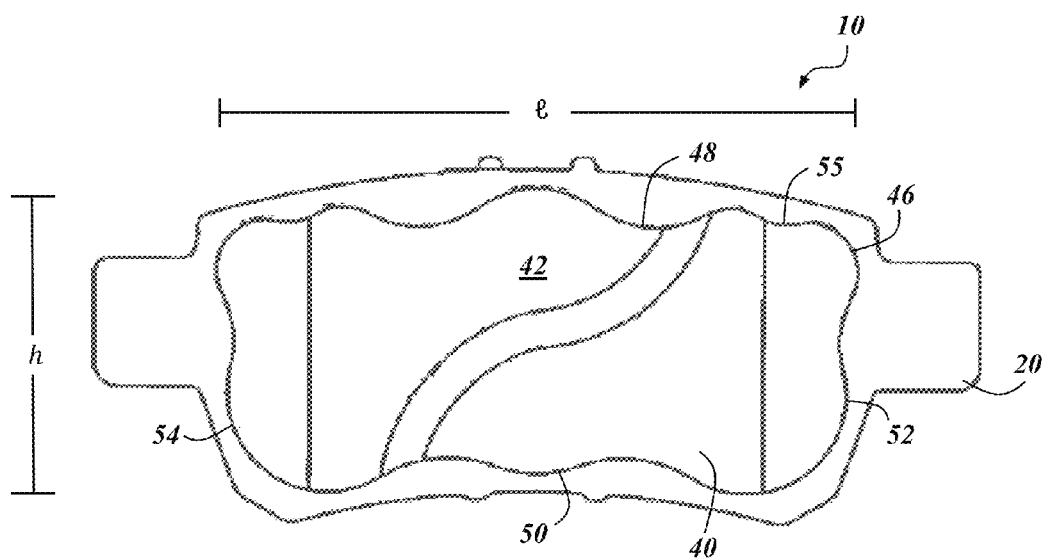

FIG. 15 shows a friction pad 40 which may have a length of 3.210 in. and a height of about 1.606 in., and thus a corresponding length to height ratio (l:h) of 1.9987:1. The area of the friction surface 42 may be 3.988 in.$^2$ and the length of the peripheral edge 46 may be 8.679 in., and the corresponding compactness is 0.0529. The complex edge region 55 of the friction pad 40 shown in FIG. 15 includes 3.5 undulations in the top peripheral edge 48, 1.5 undulations in the bottom edge 50, and 1.5 undulations in each side edge 52, 54 for a total of 8 undulations along its peripheral length 46. The undulations in the side edge 52 mirror the undulations in the other side edge 54. Although not illustrated in the figure, the area of the peripheral sidewall in this embodiment may be 2.444 in.$^2$, which results in a friction surface area to peripheral sidewall surface area ratio of 1.63:1. For the non-elongated pads shown in FIGS. 10-15, the compactness ranges between 0.0479 and 0.0578, inclusive. In another embodiment, the non-elongated friction pads may have a compactness in a range from 0.0479 to 0.0551, inclusive. In yet another embodiment, the non-elongated friction pads may have a compactness in a range from 0.0510 to 0.0529, inclusive.

Figure 16:
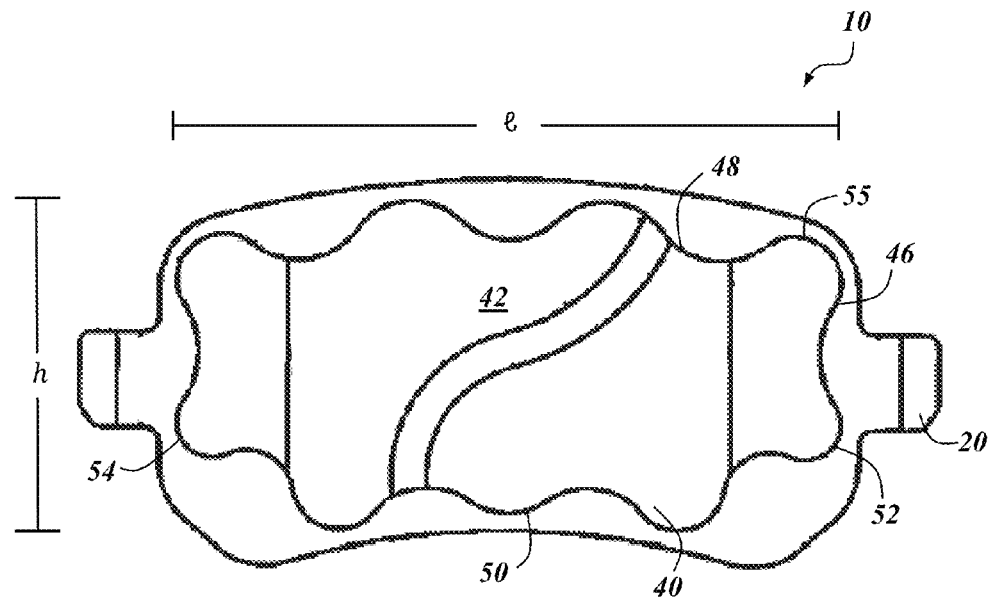
FIGS. 16-43 show multiple embodiments of friction pads with a semi-elongated shape and including various complex edge profiles.

FIGS. 16-43 illustrate semi-elongated friction pads, which have a length to height ratio (l:h) of 2:1 or greater, and less than 3:1. FIG. 16 shows a friction pad 40 which may have a length of 3.550 in. and a height of 1.767 in., and thus a corresponding length to height ratio (l:h) of 2.01:1. The area of the friction surface 42 may be 5.034 in.$^2$ and the length of the peripheral edge 46 may be 9.684 in., and the corresponding compactness is 0.0537. The complex edge region 55 of the friction pad 40 shown in FIG. 16 includes 2.5 undulations in the top peripheral edge 48, 3 undulations in the bottom edge 50, and 2 undulations in each side edge 52, 54 for a total of 9.5 undulations along its peripheral length 46. The undulations in the side edge 52 mirror the undulations in the other side edge 54. The same pad was designed without a complex edge region and no undulating edge, and the compactness was accordingly much higher (0.0628). Although not illustrated in the figure, the area of the peripheral sidewall in this embodiment may be 2.974 in.$^2$, which results in a friction surface area to peripheral sidewall surface area ratio of 1.693:1.

Figure 17:
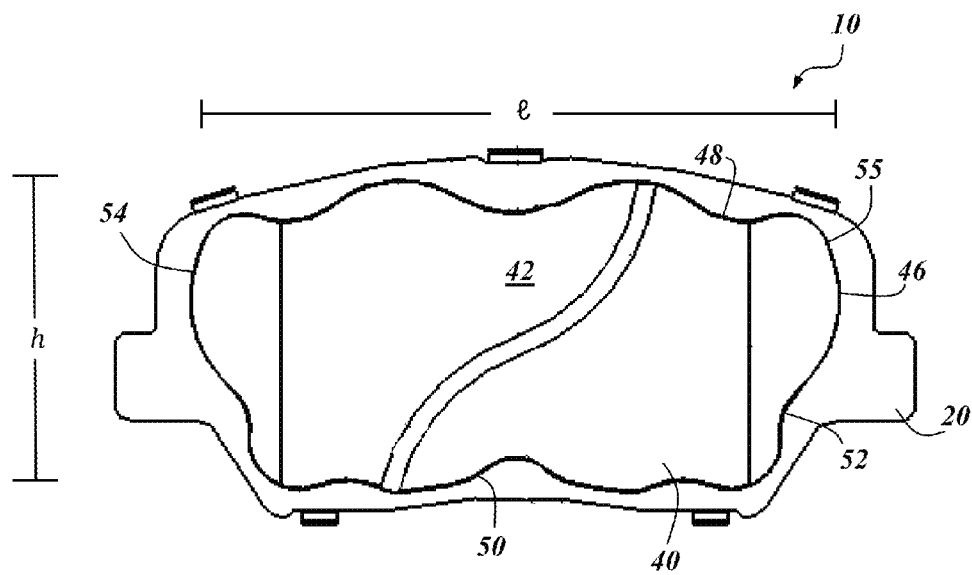

FIG. 17 shows a friction pad 40 which may have a length of 4.242 in. and a height of 2.048 in., and thus a corresponding length to height ratio (l:h) of 2.07:1. The area of the friction surface 42 may be 7.108 in.² and the length of the peripheral edge 46 may be 11.283 in., and the corresponding compactness is 0.0558. The complex edge region 55 of the friction pad 40 shown in FIG. 17 includes 2.5 undulations in the top peripheral edge 48, 2.5 undulations in the bottom edge 50, and 1.5 undulations in each side edge 52, 54 for a total of 8 undulations along its peripheral length 46. The undulations in the side edge 52 mirror the undulations in the other side edge 54. Although not illustrated in the figure, the area of the peripheral sidewall in this embodiment may be 3.711 in.², which results in a friction surface area to peripheral sidewall surface area ratio of 1.92:1.

Figure 18:
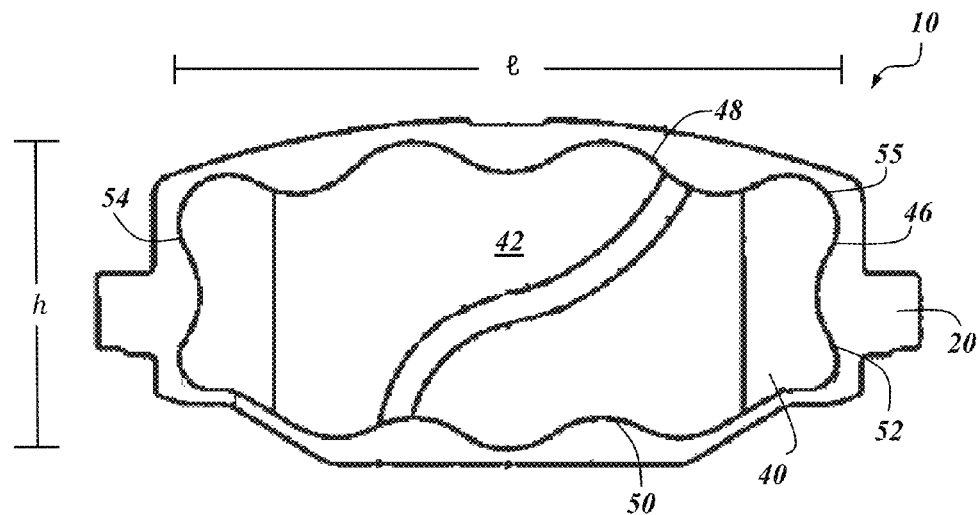

FIG. 18 shows a friction pad 40 which may have a length of 4.100 in. and a height of 1.919 in., and thus a corresponding length to height ratio (l:h) of 2.14:1. The area of the friction surface 42 may be 6.263 in.² and the length of the peripheral edge 46 may be 11.140 in., and the corresponding compactness is 0.0505. The complex edge region 55 of the friction pad 40 shown in FIG. 18 includes 2.5 undulations in the top peripheral edge 48, 2.5 undulations in the bottom edge 50, and 2 undulations in each side edge 52, 54 for a total of 9 undulations along its peripheral length 46. The undulations in the side edge 52 mirror the undulations in the other side edge 54. The same pad was designed without a complex edge region and no undulating edge, and the compactness was accordingly much higher (0.0618). Although not illustrated in the figure, the area of the peripheral sidewall in this embodiment may be 3.471 in.², which results in a friction surface area to peripheral sidewall surface area ratio of 1.8:1.

Figure 19:
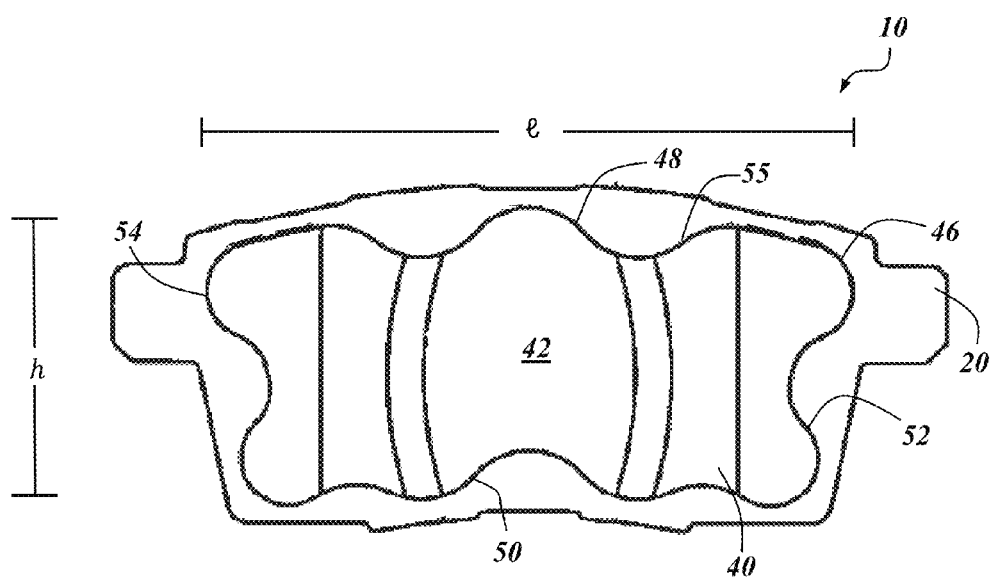

FIG. 19 shows a friction pad 40 which may have a length of 3.370 in. and a height of 1.556 in., and thus a corresponding length to height ratio (l:h) of 2.17:1. The area of the friction surface 42 may be 3.952 in.² and the length of the peripheral edge 46 may be 9.517 in., and the corresponding compactness is 0.0436. The complex edge region 55 of the friction pad 40 shown in FIG. 19 includes 1.5 undulations in the top peripheral edge 48, 2.5 undulations in the bottom edge 50, and 1.5 undulations in each side edge 52, 54 for a total of 7 undulations along its peripheral length 46. The undulations in the side edge 52 mirror the undulations in the other side edge 54. Although not illustrated in the figure, the area of the peripheral sidewall in this embodiment may be 2.907 in.², which results in a friction surface area to peripheral sidewall surface area ratio of 1.36:1.

Figure 20:
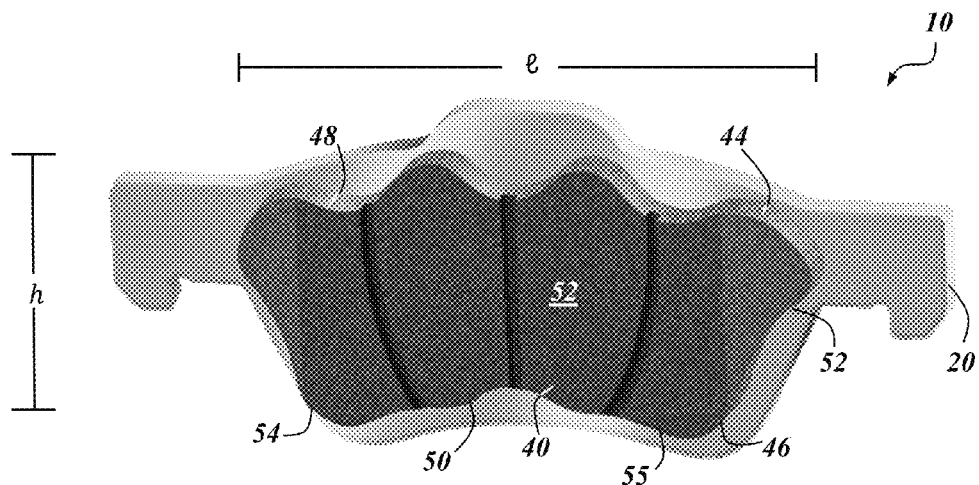

FIG. 20 shows a friction pad 40 which may have a length of 4.605 in. and a height of 2.081 in., and thus a corresponding length to height ratio (l:h) of 2.21:1. The area of the friction surface 42 may be 6.933 in.² and the length of the peripheral edge 46 may be 11.829 in., and the corresponding compactness is 0.0495. The complex edge region 55 of the friction pad 40 shown in FIG. 20 includes 2.5 undulations in the top peripheral edge 48, 2.5 undulations in the bottom edge 50, and 1.5 undulations in each side edge 52, 54 for a total of 8 undulations along its peripheral length 46. The undulations in the side edge 52 mirror the undulations in the other side edge 54. The same pad was designed without a complex edge region and no undulating edge, and the compactness was accordingly much higher (0.0585). The area of the peripheral sidewall 44 may be 3.915 in.², which results in a friction surface area to peripheral sidewall surface area ratio of 2.01:1.

Figure 21:
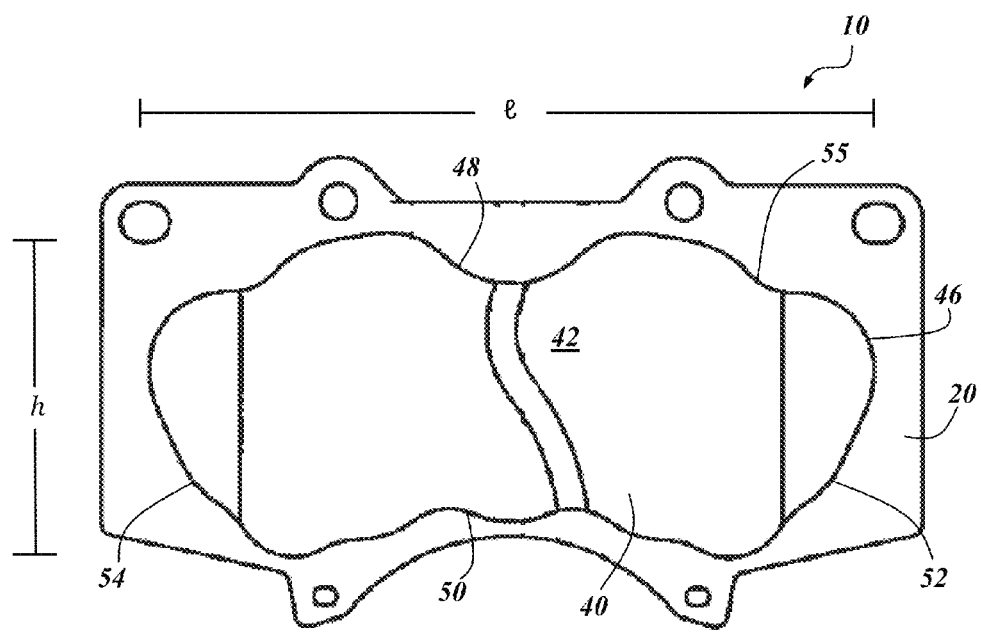

FIG. 21 shows a friction pad 40 which may have a length of 4.675 in. and a height of 2.102 in., and thus a corresponding length to height ratio (l:h) of 2.22:1. The area of the friction surface 42 may be 7.527 in.² and the length of the peripheral edge 46 may be 11.846 in., and the corresponding compactness is 0.0536. The complex edge region 55 of the friction pad 40 shown in FIG. 21 includes 2.5 undulations in the top peripheral edge 48, 4.5 undulations in the bottom edge 50, and 1 undulation in each side edge 52, 54 for a total of 8 undulations along its peripheral length 46. The same pad was designed without a complex edge region and no undulating edge, and the compactness was accordingly much higher (0.0607). Although not illustrated in the figure, the area of the peripheral sidewall in this embodiment may be 4.161 in.², which results in a friction surface area to peripheral sidewall surface area ratio of 1.81:1.

Figure 22A:
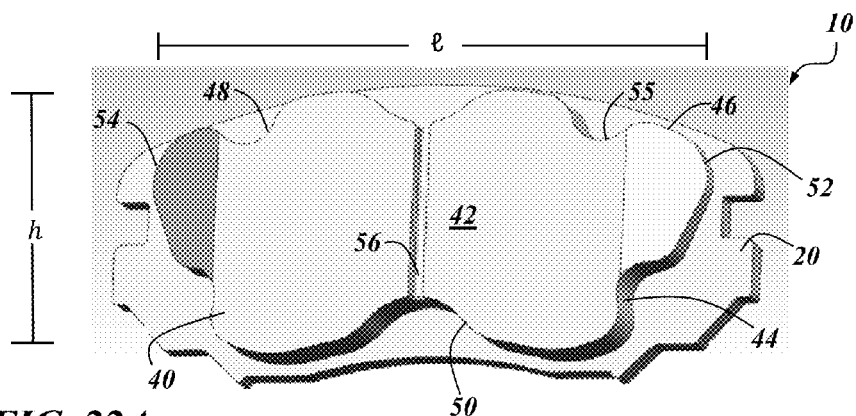
Figure 22B:
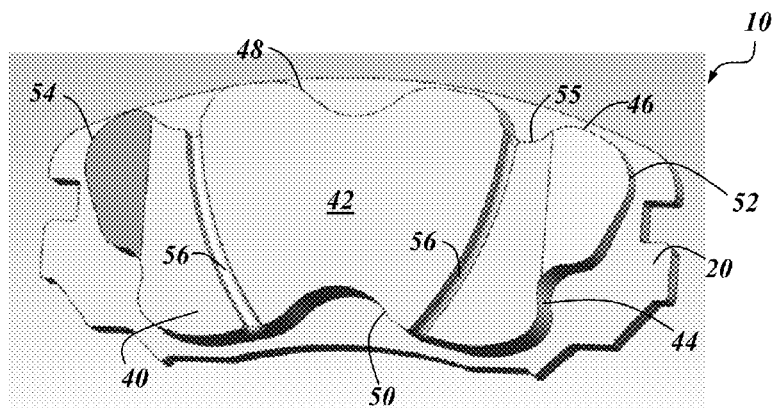
Figure 22C:
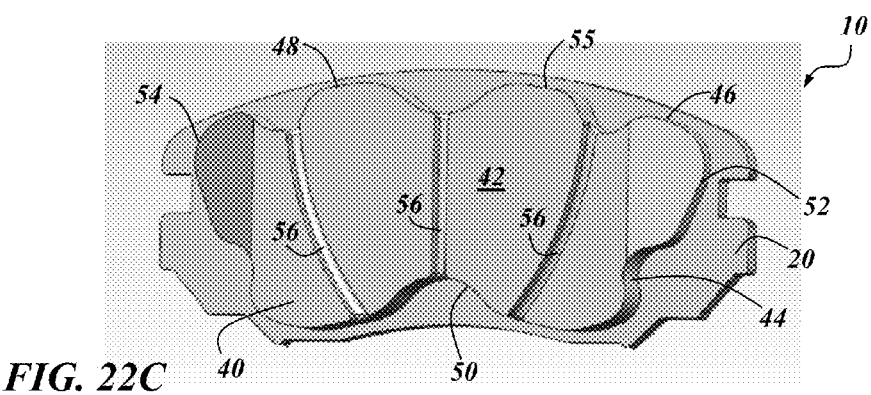

FIGS. 22A-C show a friction pad 40 which may have a length of 4.477 in. and a height of 1.913 in., and thus a corresponding length to height ratio (l:h) of 2.34:1. The friction pad 40 has the same complex edge in each of FIGS. 22A-C, while having a varying slot configuration in each respective embodiment. The area of the friction surface 42 may be 6.861 in.² and the length of the peripheral edge 46 may be 12.032 in., and the corresponding compactness is 0.0474. The complex edge region 55 of the friction pad 40 shown in FIGS. 22A-C include 2.5 undulations in the top peripheral edge 48, 1.5 undulations in the bottom edge 50, and 1 undulation in each side edge 52, 54 for a total of 6 undulations along its peripheral length 46. The undulations in the side edge 52 mirror the undulations in the other side edge 54. The area of the peripheral sidewall 44 may be 4.471 in.², which results in a friction surface area to peripheral sidewall surface area ratio of 1.53:1.

Figure 23:
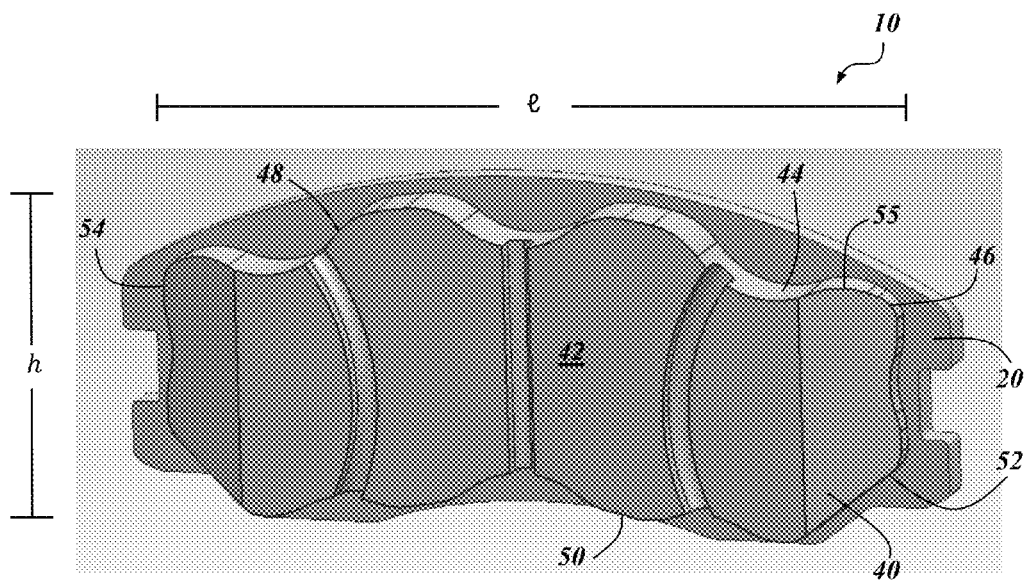

FIG. 23 shows a friction pad 40 which may have a length of 5.189 in. and a height of 2.204 in., and thus a corresponding length to height ratio (l:h) of 2.35:1. The area of the friction surface 42 may be 8.982 in.² and the length of the peripheral edge 46 may be 13.599 in., and the corresponding compactness is 0.0486. The complex edge region 55 of the friction pad 40 shown in FIG. 23 includes 2.5 undulations in the top peripheral edge 48, 2.5 undulations in the bottom edge 50, and 1.5 undulations in each side edge 52, 54 for a total of 8 undulations along its peripheral length 46. The undulations in the side edge 52 mirror the undulations in the other side edge 54. The area of the peripheral sidewall 44 may be 4.015 in.², which results in a friction surface area to peripheral sidewall surface area ratio of 2.24:1.

Figure 24:
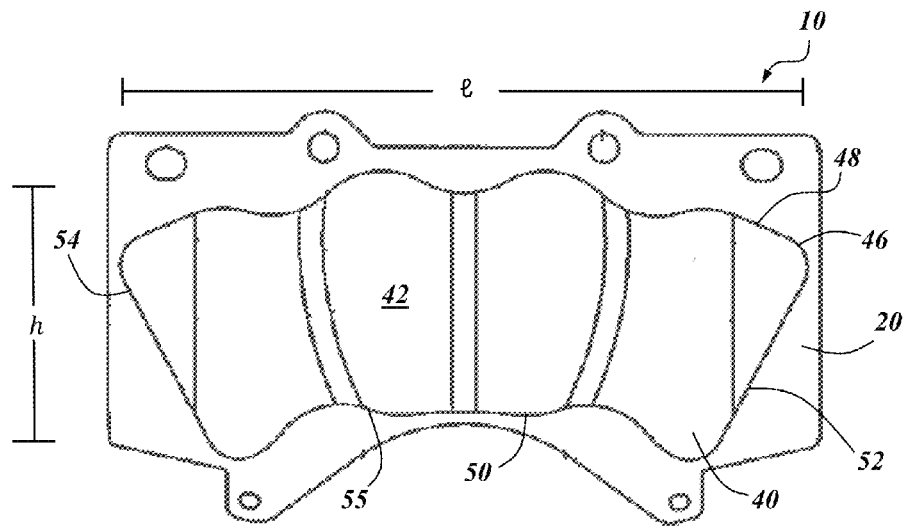

FIG. 24 shows a friction pad 40 which may have a length of 5.463 in. and a height of 2.297 in., and thus a corresponding length to height ratio (l:h) of 2.38:1. The area of the friction surface 42 may be 8.826 in.² and the length of the peripheral edge 46 may be 13.699 in., and the corresponding compactness is 0.0470. The complex edge region 55 of the friction pad 40 shown in FIG. 24 includes 2.5 undulations in the top peripheral edge 48, 2.5 undulations in the bottom edge 50, and half of an undulation in each side edge 52, 54 for a total of 6 undulations along its peripheral length 46. Although not illustrated in the figure, the area of the peripheral sidewall in this embodiment may be 5.086 in.², which results in a friction surface area to peripheral sidewall surface area ratio of 1.74:1.

Figure 25:
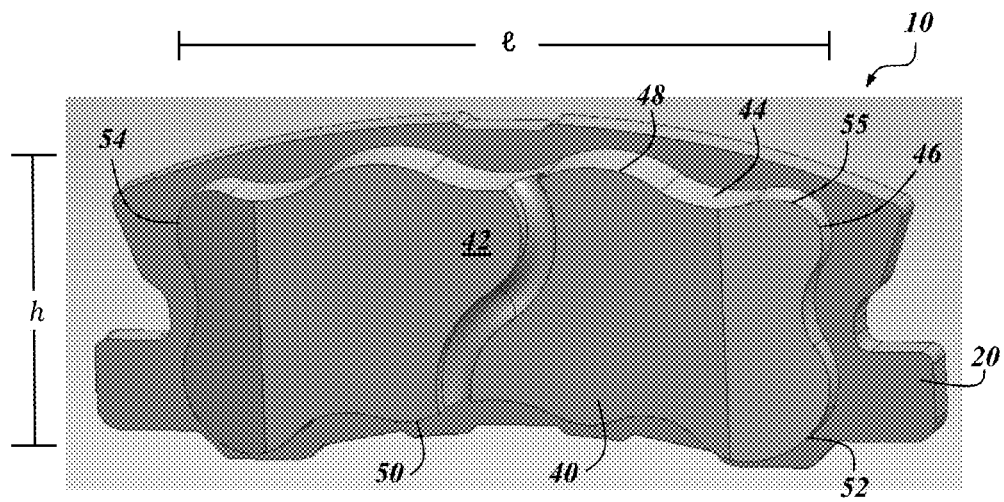

FIG. 25 shows a friction pad 40 which may have a length of 3.614 in. and a height of 1.514 in., and thus a corresponding length to height ratio (l:h) of 2.39:1. The area of the friction surface 42 may be 4.731 in.² and the length of the peripheral edge 46 may be 9.856 in., and the corresponding compactness is 0.0487. The complex edge region 55 of the friction pad 40 shown in FIG. 25 includes 2.5 undulations in the top peripheral edge 48, 3.5 undulations in the bottom edge 50, and 1 undulation in each side edge 52, 54 for a total of 8 undulations along its peripheral length 46. The same pad was designed without a complex edge region and no undulating edge, and the compactness was accordingly much higher (0.0559). The area of the peripheral sidewall 44 may be 2.332 in.$^2$, which results in a friction surface area to peripheral sidewall surface area ratio of 2.04:1.

Figure 26:
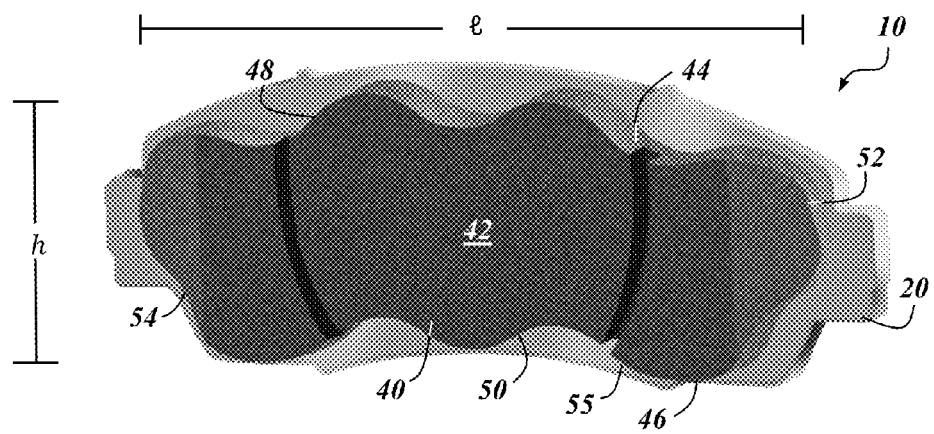

FIG. 26 shows a friction pad 40 which may have a length of 3.890 in. and a height of 1.623 in., and thus a corresponding length to height ratio (l:h) of 2.4:1. The area of the friction surface 42 may be 5.095 in.$^2$ and the length of the peripheral edge 46 may be 9.774 in., and the corresponding compactness is 0.0533. The complex edge region 55 of the friction pad 40 shown in FIG. 26 includes 2.5 undulations in the top peripheral edge 48, 2.5 undulations in the bottom edge 50, and 1 undulation in each side edge 52, 54 for a total of 7 undulations along its peripheral length 46. The same pad was designed without a complex edge region and no undulating edge, and the compactness was accordingly much higher (0.0586). The area of the peripheral sidewall 44 may be 2.481 in.$^2$, which results in a friction surface area to peripheral sidewall surface area ratio of 2.05:1.

Figure 27:
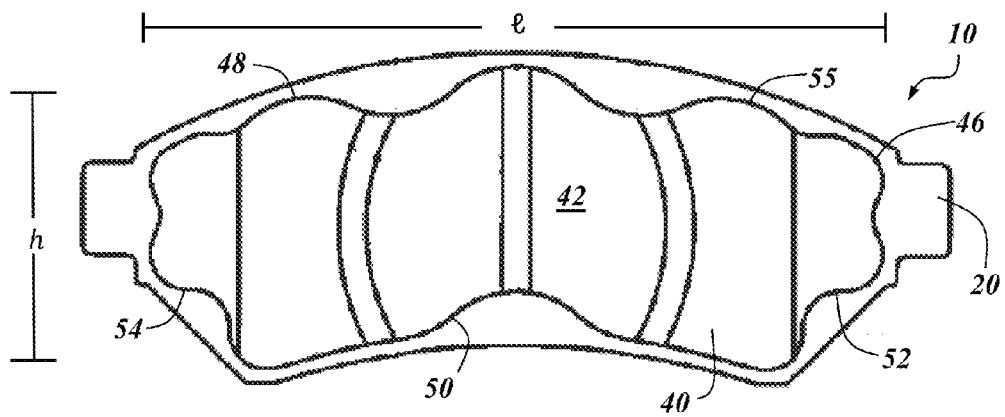

FIG. 27 shows a friction pad 40 which may have a length of 4.910 in. and a height of 2.038 in., and thus a corresponding length to height ratio (l:h) of 2.41:1. The area of the friction surface 42 may be 7.166 in.$^2$ and the length of the peripheral edge 46 may be 12.636 in., and the corresponding compactness is 0.0449. The complex edge region 55 of the friction pad 40 shown in FIG. 27 includes 3.5 undulations in the top peripheral edge 48, 1.5 undulations in the bottom edge 50, and 2 undulations in each side edge 52, 54 for a total of 9 undulations along its peripheral length 46. The undulations in the side edge 52 mirror the undulations in the other side edge 54. The same pad was designed without a complex edge region and no undulating edge, and the compactness was accordingly much higher (0.0550). Although not illustrated in the figure, the area of the peripheral sidewall in this embodiment may be 3.791 in.$^2$, which results in a friction surface area to peripheral sidewall surface area ratio of 1.89:1.

Figure 28:
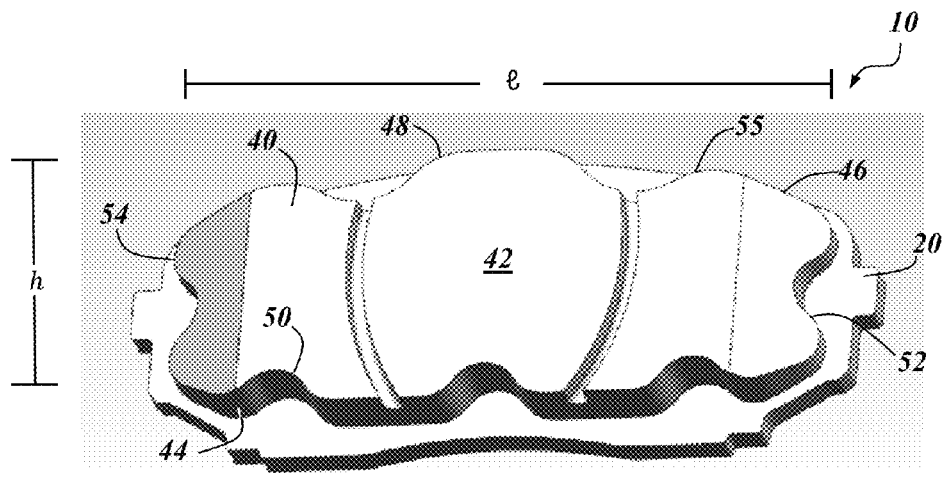

FIG. 28 shows a friction pad 40 which may have a length of 4.827 in. and a height of 1.957 in., and thus a corresponding length to height ratio (l:h) of 2.47:1. The area of the friction surface 42 may be 7.504 in.$^2$ and the length of the peripheral edge 46 may be 12.949 in., and the corresponding compactness is 0.0448. The complex edge region 55 of the friction pad 40 shown in FIG. 28 includes 1.5 undulations in the top peripheral edge 48, 2.5 undulations in the bottom edge 50, and 1.5 undulations in each side edge 52, 54 for a total of 7 undulations along its peripheral length 46. The undulations in the side edge 52 mirror the undulations in the other side edge 54. The area of the peripheral sidewall 44 may be 4.687 in.$^2$, which results in a friction surface area to peripheral sidewall surface area ratio of 1.60:1.

Figure 29:
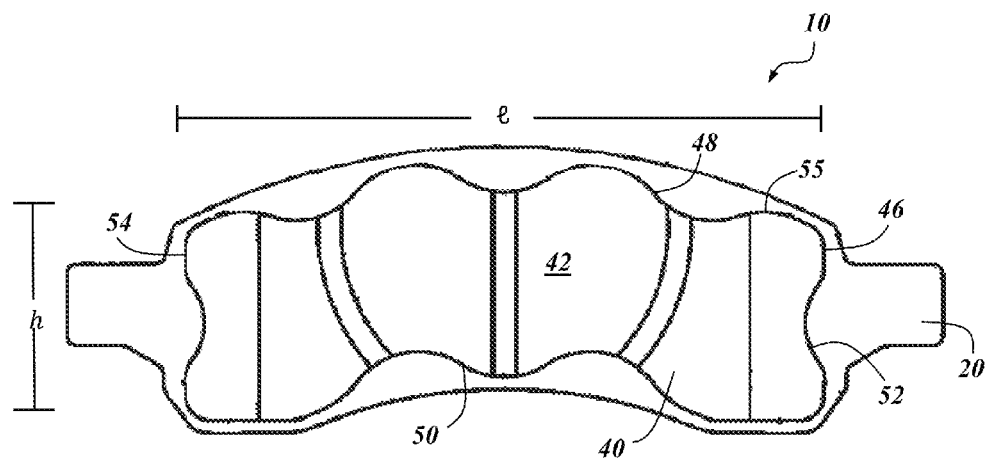

FIG. 29 shows a friction pad 40 which may have a length of 5.114 in. and a height of 2.062 in., and thus a corresponding length to height ratio (l:h) of 2.48:1. The area of the friction surface 42 may be 7.817 in.$^2$ and the length of the peripheral edge 46 may be 14.077 in., and the corresponding compactness is 0.0394. The complex edge region 55 of the friction pad 40 shown in FIG. 29 includes 2.5 undulations in the top peripheral edge 48, 1.5 undulations in the bottom edge 50, and 1.5 undulations in each side edge 52, 54 for a total of 7 undulations along its peripheral length 46. The undulations in the side edge 52 mirror the undulations in the other side edge 54. The same pad was designed without a complex edge region and no undulating edge, and the compactness was accordingly much higher (0.0507). Although not illustrated in the figure, the area of the peripheral sidewall in this embodiment may be 3.489 in.$^2$, which results in a friction surface area to peripheral sidewall surface area ratio of 2.24:1.

Figure 30:
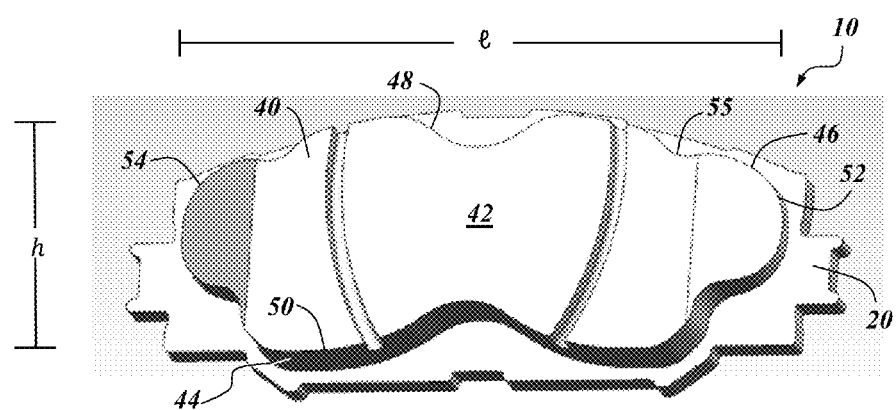

FIG. 30 shows a friction pad 40 which may have a length of 4.614 in. and a height of 1.849 in., and thus a corresponding length to height ratio (l:h) of 2.49:1. The area of the friction surface 42 may be 6.498 in.$^2$ and the length of the peripheral edge 46 may be 11.481 in., and the corresponding compactness is 0.0493. The complex edge region 55 of the friction pad 40 shown in FIG. 30 includes 2.5 undulations in the top peripheral edge 48, 1.5 undulations in the bottom edge 50, and 1 undulation in each side edge 52, 54 for a total of 6 undulations along its peripheral length 46. The same pad was designed without a complex edge region and no undulating edge, and the compactness was accordingly much higher (0.0578). The area of the peripheral sidewall 44 may be 4.148 in.$^2$, which results in a friction surface area to peripheral sidewall surface area ratio of 1.57:1.

Figure 31:
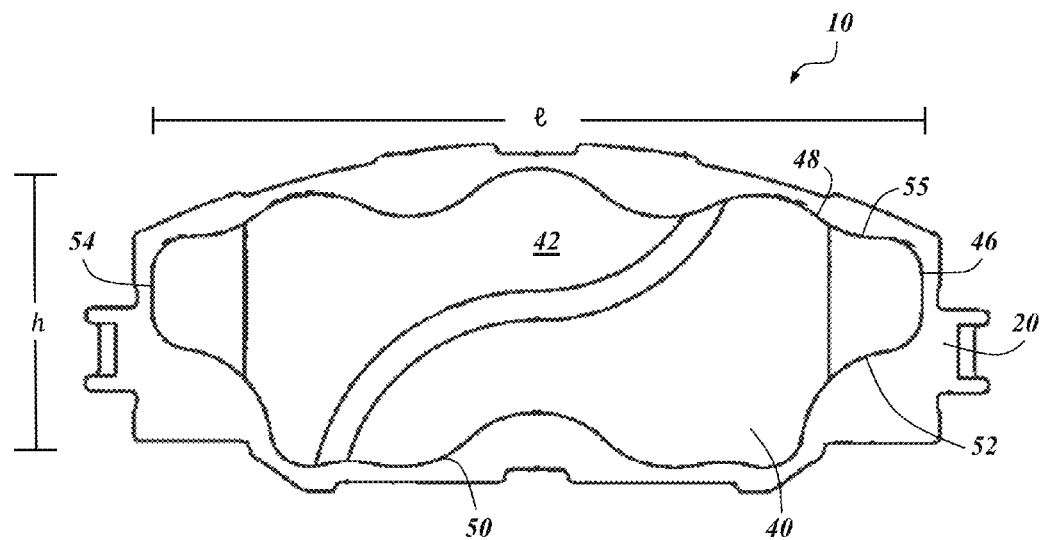

FIG. 31 shows a friction pad 40 which may have a length of 4.915 in. and a height of 1.924 in., and thus a corresponding length to height ratio (l:h) of 2.55:1. The area of the friction surface 42 may be 6.796 in.$^2$ and the length of the peripheral edge 46 may be 12.179 in., and the corresponding compactness is 0.0458. The complex edge region 55 of the friction pad 40 shown in FIG. 31 includes 3.5 undulations in the top peripheral edge 48, 3.5 undulations in the bottom edge 50, and 1 undulation in each side edge 52, 54 for a total of 9 undulations along its peripheral length 46. The same pad was designed without a complex edge region and no undulating edge, and the compactness was accordingly much higher (0.0573). Although not illustrated in the figure, the area of the peripheral sidewall in this embodiment may be 4.647 in.$^2$, which results in a friction surface area to peripheral sidewall surface area ratio of 1.46:1.

Figure 32:
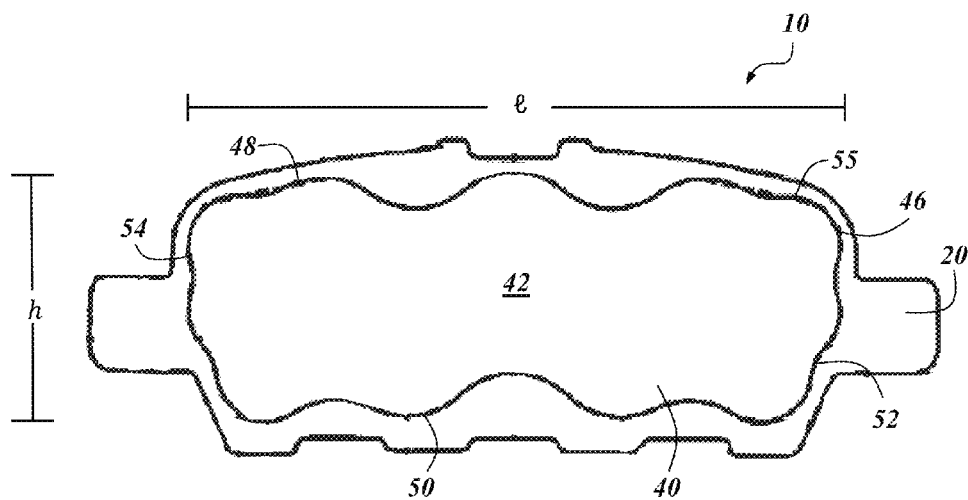

FIG. 32 shows a friction pad 40 which may have a length of 3.188 in. and a height of 1.228 in., and thus a corresponding length to height ratio (l:h) of 2.60:1. The area of the friction surface 42 may be 3.167 in.$^2$ and the length of the peripheral edge 46 may be 7.808 in., and the corresponding compactness is 0.0519. The complex edge region 55 of the friction pad 40 shown in FIG. 32 includes 3.5 undulations in the top peripheral edge 48, 3.5 undulations in the bottom edge 50, and 2 undulations in each side edge 52, 54 for a total of 11 undulations along its peripheral length 46. The undulations in the side edge 52 mirror the undulations in the other side edge 54. The same pad was designed without a complex edge region and no undulating edge, and the compactness was accordingly much higher (0.0561). Although not illustrated in the figure, the area of the peripheral sidewall in this embodiment may be 1.833 in.$^2$, which results in a friction surface area to peripheral sidewall surface area ratio of 1.73:1. This embodiment also serves as an example of a friction pad that does not have any grooves or chamfers.

Figure 33:
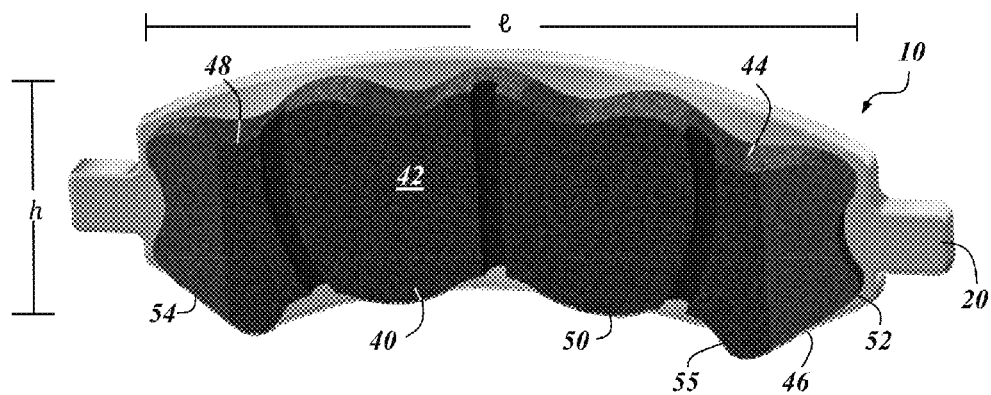

FIG. 33 shows a friction pad 40 which may have a length of 4.409 in. and a height of 1.669 in., and thus a corresponding length to height ratio (l:h) of 2.64:1. The area of the friction surface 42 may be 5.359 in.$^2$ and the length of the peripheral edge 46 may be 11.265 in., and the corresponding compactness is 0.0422. The complex edge region 55 of the friction pad 40 shown in FIG. 33 includes 3.5 undulations in the top peripheral edge 48, 3.5 undulations in the bottom edge 50, and 1 undulation in each side edge 52, 54 for a total of 9 undulations along its peripheral length 46. The area of the peripheral sidewall 44 may be 3.662 in.$^2$, which results in a friction surface area to peripheral sidewall surface area ratio of 1.46:1.

Figure 34:
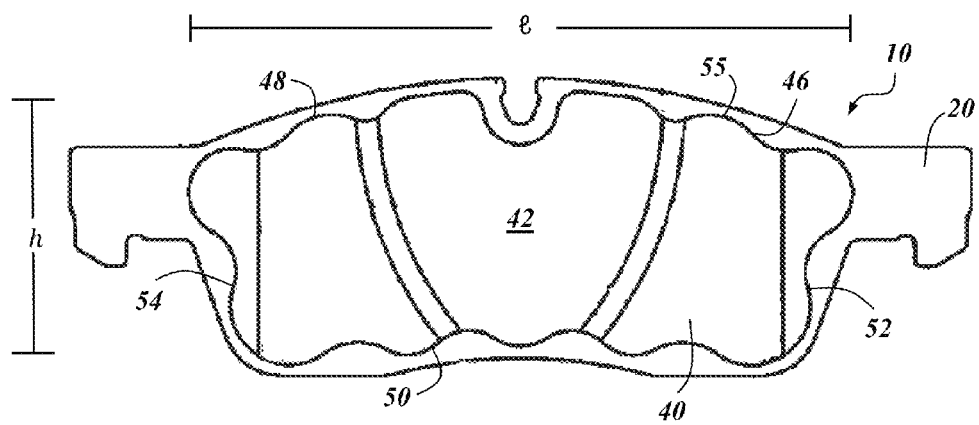

FIG. 34 shows a friction pad 40 which may have a length of 5.601 in. and a height of about 2.124 in., and thus a corresponding length to height ratio (l:h) of 2.64:1. The area of the friction surface 42 may be 9.831 in.$^2$ and the length of the peripheral edge 46 may be 14.820 in., and the corresponding compactness is 0.0448. The complex edge region 55 of the friction pad 40 shown in FIG. 34 includes 4.5 undulations in the top peripheral edge 48, 3.5 undulations in the bottom edge 50, and 1.5 undulations in each side edge 52, 54 for a total of 11 undulations along its peripheral length 46. The undulations in the side edge 52 mirror the undulations in the other side edge 54. The same pad was designed without a complex edge region and no undulating edge, and the compactness was accordingly much higher (0.0530). Although not illustrated in the figure, the area of the peripheral sidewall in this embodiment may be 5.628 in.$^2$, which results in a friction surface area to peripheral sidewall surface area ratio of 1.75:1.

Figure 35:
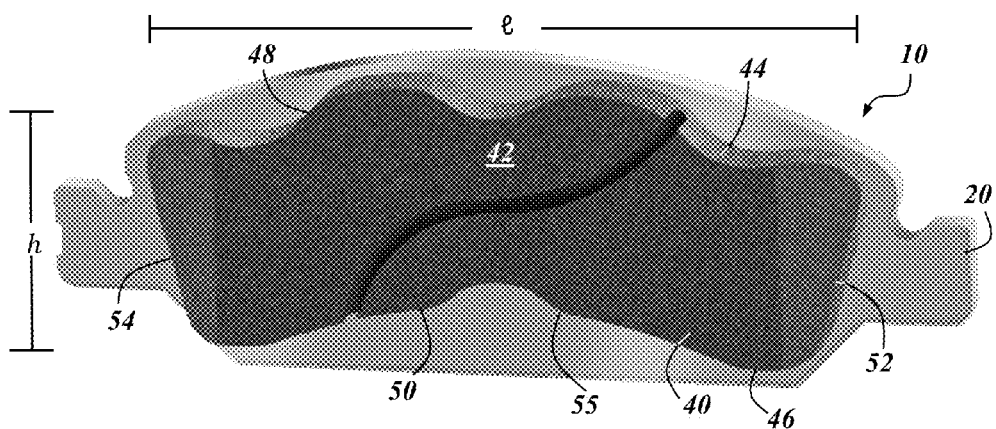

FIG. 35 shows a friction pad 40 which may have a length of 5.659 in. and a height of about 2.150 in., and thus a corresponding length to height ratio (l:h) of 2.22:1. The area of the friction surface 42 may be 8.760 in.$^2$ and the length of the peripheral edge 46 may be 14.139 in., and the corresponding compactness is 0.0438. The complex edge region 55 of the friction pad 40 shown in FIG. 35 includes 2.5 undulations in the top peripheral edge 48, 2.5 undulations in the bottom edge 50, and half of an undulation in each side edge 52, 54 for a total of 6 undulations along its peripheral length 46. The same pad was designed without a complex edge region and no undulating edge, and the compactness was accordingly much higher (0.0496). The area of the peripheral sidewall 44 may be 5.375 in.$^2$, which results in a friction surface area to peripheral sidewall surface area ratio of 1.63:1.

Figure 36:
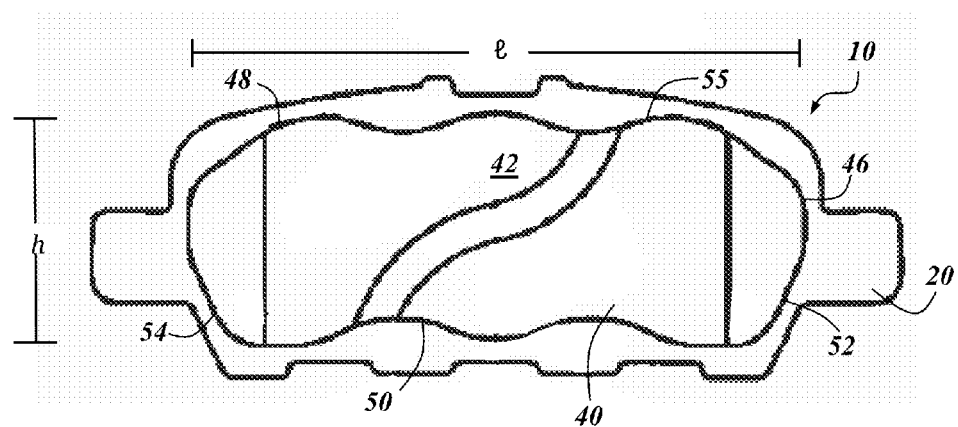

FIG. 36 shows a friction pad 40 which may have a length of 3.155 in. and a height of 1.190 in., and thus a corresponding length to height ratio (l:h) of 2.65:1. The area of the friction surface 42 may be 3.167 in.$^2$ and the length of the peripheral edge 46 may be 7.808 in., and the corresponding compactness is 0.0519. The complex edge region 55 of the friction pad 40 shown in FIG. 36 includes 3.5 undulations in the top peripheral edge 48, 2.5 undulations in the bottom edge 50, and 1 undulation in each side edge 52, 54 for a total of 8 undulations along its peripheral length 46. The same pad was designed without a complex edge region and no undulating edge, and the compactness was accordingly much higher (0.0561). Although not illustrated in the figure, the area of the peripheral sidewall in this embodiment may be 1.833 in.$^2$, which results in a friction surface area to peripheral sidewall surface area ratio of 1.73:1.

Figure 37:
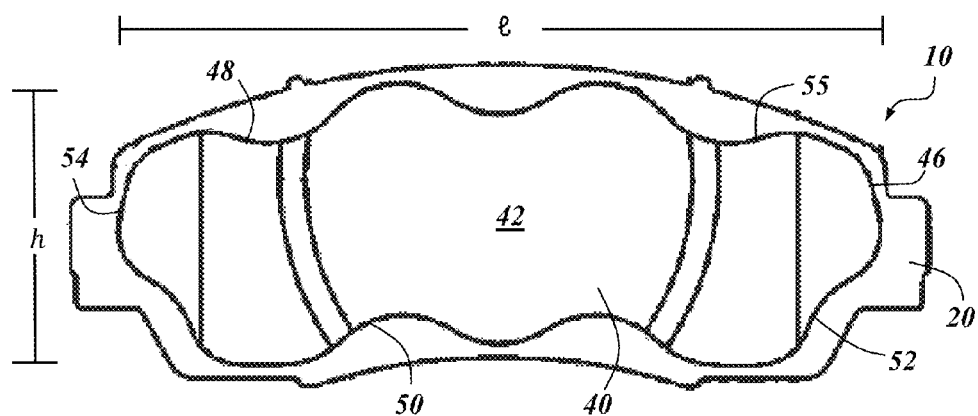

FIG. 37 shows a friction pad 40 which may have a length of 5.409 in. and a height of 2.011 in., and thus a corresponding length to height ratio (l:h) of 2.69:1. The area of the friction surface 42 may be 8.052 in.$^2$ and the length of the peripheral edge 46 may be 13.301 in., and the corresponding compactness is 0.0455. The complex edge region 55 of the friction pad 40 shown in FIG. 37 includes 2.5 undulations in the top peripheral edge 48, 2.5 undulations in the bottom edge 50, and 1 undulation in each side edge 52, 54 for a total of 7 undulations along its peripheral length 46. The same pad was designed without a complex edge region and no undulating edge, and the compactness was accordingly much higher (0.0559). Although not illustrated in the figure, the area of the peripheral sidewall in this embodiment may be 4.984 in.$^2$, which results in a friction surface area to peripheral sidewall surface area ratio of 1.62:1.

Figure 38:
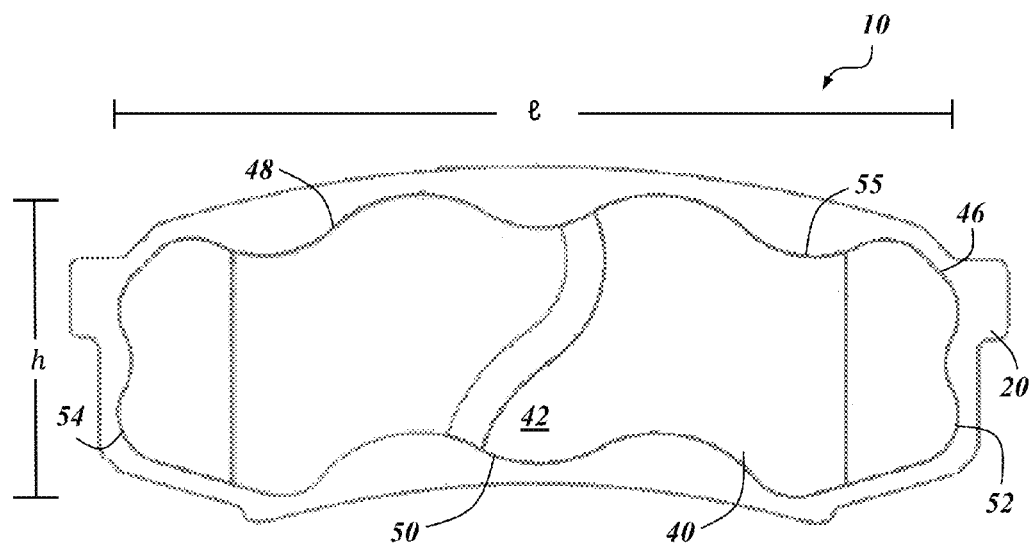

FIG. 38 shows a friction pad 40 which may have a length of 4.095 in. and a height of 1.473 in., and thus a corresponding length to height ratio (l:h) of 2.78:1. The area of the friction surface 42 may be 4.587 in.$^2$ and the length of the peripheral edge 46 may be 10.408 in., and the corresponding compactness is 0.0423. The complex edge region 55 of the friction pad 40 shown in FIG. 21 includes 2.5 undulations in the top peripheral edge 48, 1.5 undulations in the bottom edge 50, and 1.5 undulations in each side edge 52, 54 for a total of 7 undulations along its peripheral length 46. The undulations in the side edge 52 mirror the undulations in the other side edge 54. The same pad was designed without a complex edge region and no undulating edge, and the compactness was accordingly much higher (0.0526). Although not illustrated in the figure, the area of the peripheral sidewall in this embodiment may be 2.991 in.$^2$, which results in a friction surface area to peripheral sidewall surface area ratio of 1.53:1.

Figure 39:
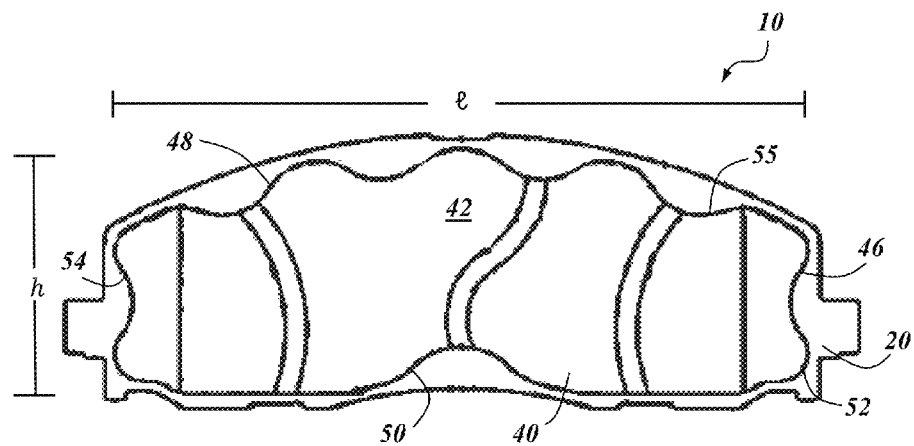

FIG. 39 shows a friction pad 40 which may have a length of 6.291 in. and a height of about 2.254 in., and thus a corresponding length to height ratio (l:h) of 2.79:1. The area of the friction surface 42 may be 11.064 in.$^2$ and the length of the peripheral edge 46 may be 16.071 in., and the corresponding compactness is 0.0428. The complex edge region 55 of the friction pad 40 shown in FIG. 39 includes 3.5 undulations in the top peripheral edge 48, 2.5 undulations in the bottom edge 50, and 1.5 undulations in each side edge 52, 54 for a total of 9 undulations along its peripheral length 46. The undulations in the side edge 52 mirror the undulations in the other side edge 54. The same pad was designed without a complex edge region and no undulating edge, and the compactness was accordingly much higher (0.0520). Although not illustrated in the figure, the area of the peripheral sidewall in this embodiment may be 5.832 in.$^2$, which results in a friction surface area to peripheral sidewall surface area ratio of 1.90:1.

Figure 40:
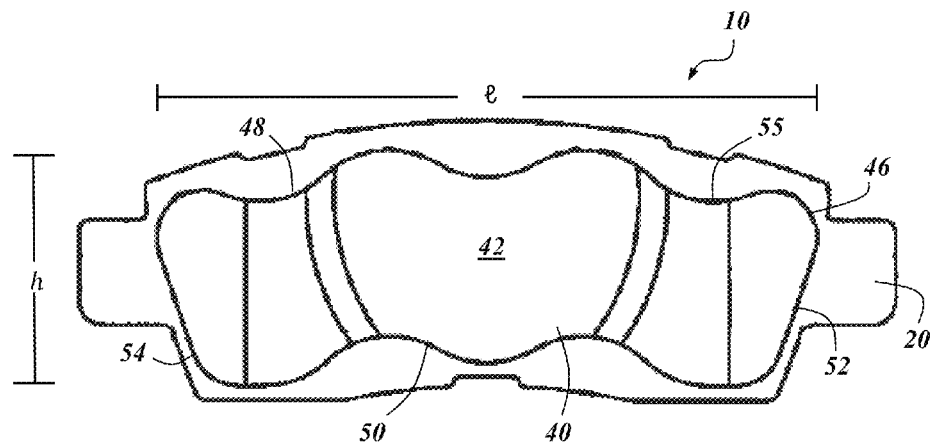

FIG. 40 shows a friction pad 40 which may have a length of 4.385 in. and a height of 1.569 in., and thus a corresponding length to height ratio (l:h) of 2.79:1. The area of the friction surface 42 may be 5.122 in.$^2$ and the length of the peripheral edge 46 may be 10.945 in., and the corresponding compactness is 0.0428. The complex edge region 55 of the friction pad 40 shown in FIG. 40 includes 2.5 undulations in the top peripheral edge 48, 1.5 undulations in the bottom edge 50, and half of an undulation in each side edge 52, 54 for a total of 5 undulations along its peripheral length 46. The same pad was designed without a complex edge region and no undulating edge, and the compactness was accordingly much higher (0.0530). Although not illustrated in the figure, the area of the peripheral sidewall in this embodiment may be 3.465 in.$^2$, which results in a friction surface area to peripheral sidewall surface area ratio of 1.48:1.

Figure 41:
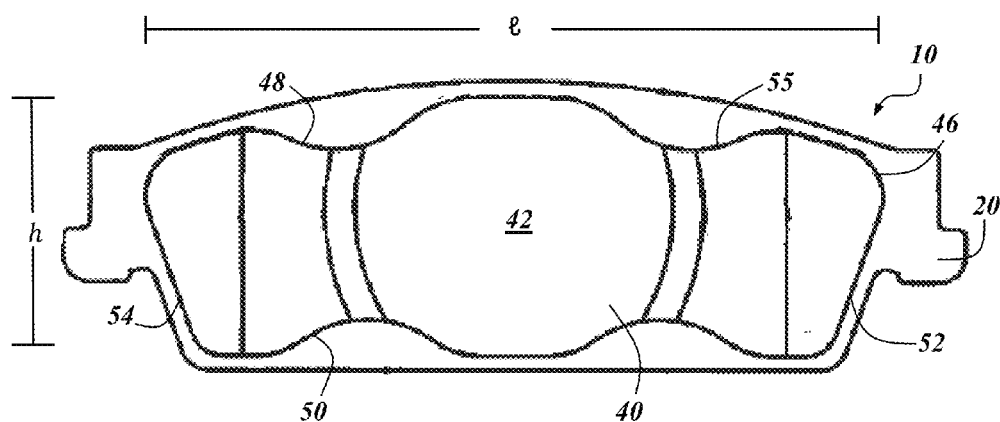

FIG. 41 shows a friction pad 40 which may have a length of 4.574 in. and a height of 1.605 in., and thus a corresponding length to height ratio (l:h) of 2.85:1. The area of the friction surface 42 may be 5.718 in.$^2$ and the length of the peripheral edge 46 may be 11.264 in., and the corresponding compactness is 0.0451. The complex edge region 55 of the friction pad 40 shown in FIG. 41 includes 1.5 undulations in the top peripheral edge 48, 1.5 undulations in the bottom edge 50, and half of an undulation in each side edge 52, 54 for a total of 4 undulations along its peripheral length 46. Although not illustrated in the figure, the area of the peripheral sidewall in this embodiment may be 3.591 in.$^2$, which results in a friction surface area to peripheral sidewall surface area ratio of 1.59:1.

Figure 42:
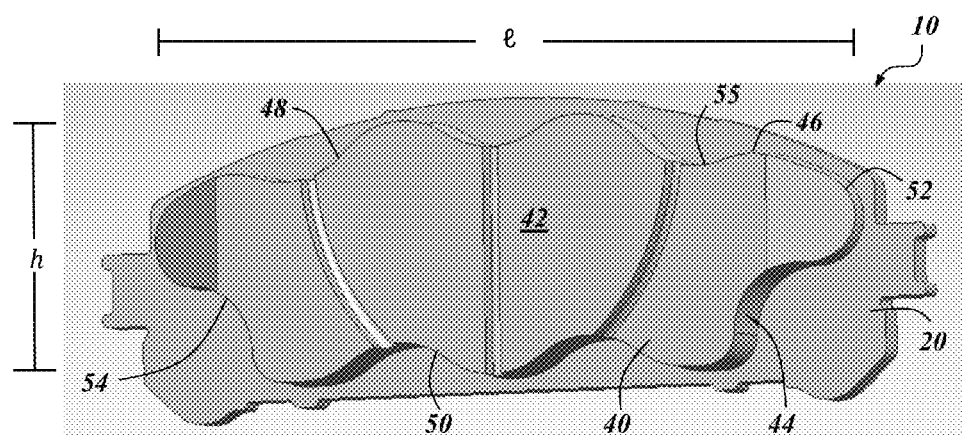

FIG. 42 shows a friction pad 40 which may have a length of 5.587 in. and a height of 1.931 in., and thus a corresponding length to height ratio (l:h) of 2.89:1. The area of the friction surface 42 may be 7.576 in.² and the length of the peripheral edge 46 may be 13.458 in., and the corresponding compactness is 0.0418. The complex edge region 55 of the friction pad 40 shown in FIG. 42 includes 2.5 undulations in the top peripheral edge 48, 2.5 undulations in the bottom edge 50, and 1 undulation in each side edge 52, 54 for a total of 8 undulations along its peripheral length 46. The same pad was designed without a complex edge region and no undulating edge, and the compactness was accordingly much higher (0.0544). The area of the peripheral sidewall 44 may be 5.152 in.², which results in a friction surface area to peripheral sidewall surface area ratio of 1.47:1.

Figure 43:
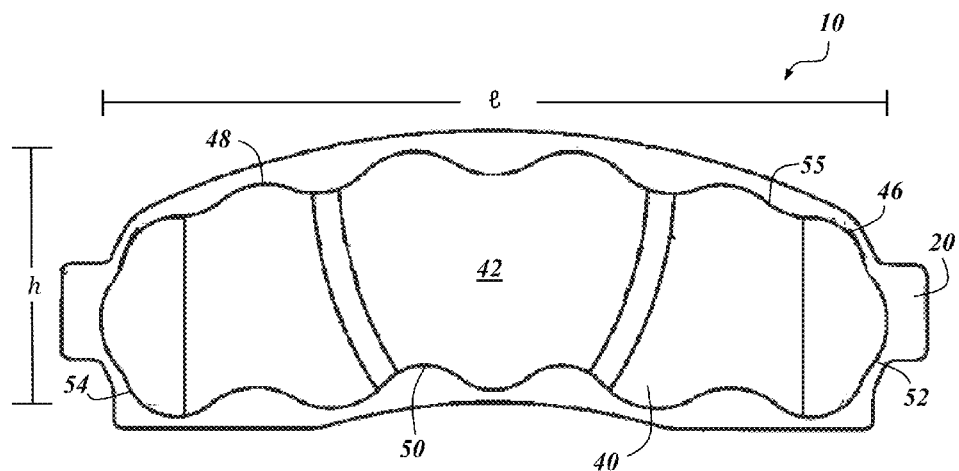

FIG. 43 shows a friction pad 40 which may have a length of 5.502 in. and a height of 1.862 in., and thus a corresponding length to height ratio (l:h) of 2.95:1. The area of the friction surface 42 may be 7.655 in.² and the length of the peripheral edge 46 may be 13.475 in., and the corresponding compactness is 0.0422. The complex edge region 55 of the friction pad 40 shown in FIG. 43 includes 4.5 undulations in the top peripheral edge 48, 4.5 undulations in the bottom edge 50, and 2 undulations in each side edge 52, 54 for a total of 13 undulations along its peripheral length 46. The undulations in the side edge 52 mirror the undulations in the other side edge 54. The same pad was designed without a complex edge region and no undulating edge, and the compactness was accordingly much higher (0.0515). Although not illustrated in the figure, the area of the peripheral sidewall in this embodiment may be 4.044 in.², which results in a friction surface area to peripheral sidewall surface area ratio of 1.89:1.

The semi-elongated friction pad embodiments shown in FIGS. 16-43 and described above have an average compactness of 0.047. In contrast with semi-elongated friction pads that do not have a complex edge profile, semi-elongated friction pads may have a compactness in a range from 0.0394 to 0.0495, inclusive. In another embodiment, the semi-elongated friction pads may have a compactness in a range from 0.0394 to 0.0474, inclusive. In yet another embodiment, the semi-elongated friction pads may have a compactness in a range from 0.0422 to 0.0449, inclusive. The average compactness for comparable semi-elongated friction pads that do not have a complex edge profile is much higher than that for the friction pads having a complex edge profile (0.0556 versus 0.047).

Figure 44:
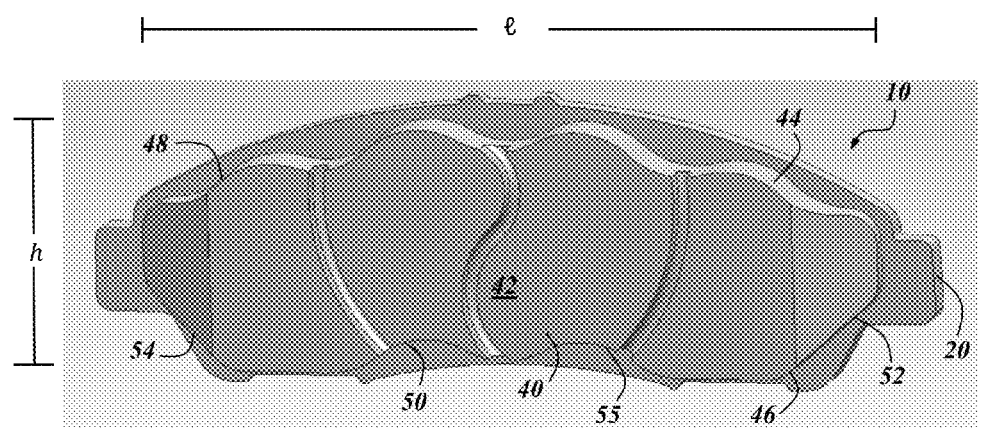
FIGS. 44-50 show multiple embodiments of friction pads with an elongated shape and including various complex edge profiles.

FIGS. 44-50 illustrate elongated friction pads, which have a length to height ratio (l:h) of 3:1 or greater, and typically no greater than 5:1. FIG. 44 shows a friction pad 40 which may have a length of 5.840 in. and a height of 1.910 in., and thus a corresponding length to height ratio (l:h) of 3.06:1. The area of the friction surface 42 may be 8.621 in.² and the length of the peripheral edge 46 may be 13.808 in., and the corresponding compactness is 0.0452. The complex edge region 55 of the friction pad 40 shown in FIG. 44 includes 4.5 undulations in the top peripheral edge 48, 1.5 undulations in the bottom edge 50, and half of an undulation in each side edge 52, 54 for a total of 7 undulations along its peripheral length 46. The same pad was designed without a complex edge region and no undulating edge, and the compactness was accordingly much higher (0.0516). The area of the peripheral sidewall 44 may be 4.556 in.², which results in a friction surface area to peripheral sidewall surface area ratio of 1.89:1.

Figure 45:
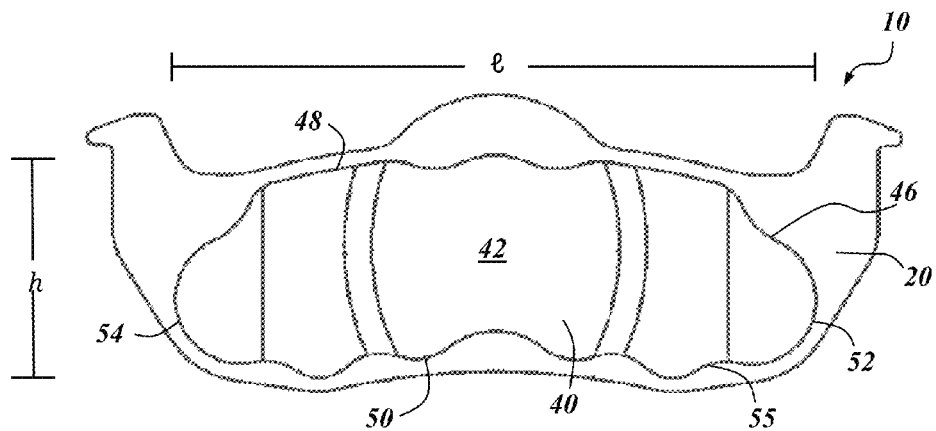

FIG. 45 shows a friction pad 40 which may have a length of 4.400 in. and a height of 1.395 in., and thus a corresponding length to height ratio (l:h) of 3.15:1. The area of the friction surface 42 may be 5.138 in.² and the length of the peripheral edge 46 may be 10.457 in., and the corresponding compactness is 0.0470. The complex edge region 55 of the friction pad 40 shown in FIG. 45 includes 3.5 undulations in the top peripheral edge 48, 4.5 undulations in the bottom edge 50, and half of an undulation in each side edge 52, 54 for a total of 9 undulations along its peripheral length 46. Although not illustrated in the figure, the area of the peripheral sidewall in this embodiment may be 4.013 in.², which results in a friction surface area to peripheral sidewall surface area ratio of 1.28:1.

Figure 46:
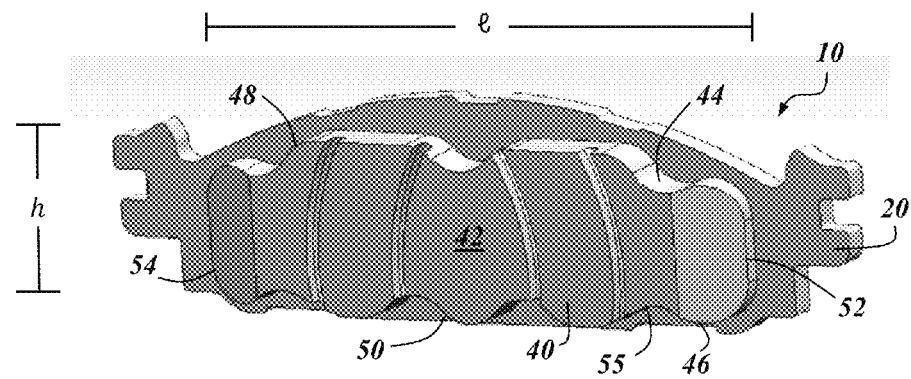

FIG. 46 shows a friction pad 40 which may have a length of 5.625 in. and a height of 1.678 in., and thus a corresponding length to height ratio (l:h) of 3.35:1. The area of the friction surface 42 may be 7.963 in.² and the length of the peripheral edge 46 may be 14.055 in., and the corresponding compactness is 0.0403. The complex edge region 55 of the friction pad 40 shown in FIG. 46 includes 2.5 undulations in the top peripheral edge 48, 3.5 undulations in the bottom edge 50, and half of an undulation in each side edge 52, 54 for a total of 7 undulations along its peripheral length 46. The area of the peripheral sidewall 44 may be 4.972 in.², which results in a friction surface area to peripheral sidewall surface area ratio of 1.60:1.

Figure 47:
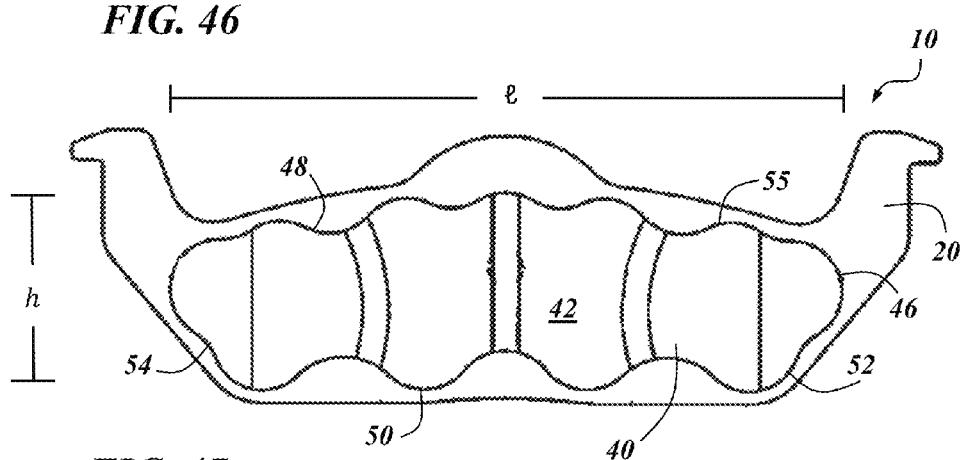

FIG. 47 shows a friction pad 40 which may have a length of 4.833 in. and a height of 1.424 in., and thus a corresponding length to height ratio (l:h) of 3.39:1. The area of the friction surface 42 may be 5.083 in.² and the length of the peripheral edge 46 may be 11.566 in., and the corresponding compactness is 0.0380. The complex edge region 55 of the friction pad 40 shown in FIG. 47 includes 5.5 undulations in the top peripheral edge 48, 3.5 undulations in the bottom edge 50, and 1 undulation in each side edge 52, 54 for a total of 11 undulations along its peripheral length 46. The same pad was designed without a complex edge region and no undulating edge, and the compactness was accordingly much higher (0.0485). Although not illustrated in the figure, the area of the peripheral sidewall in this embodiment may be 4.312 in.², which results in a friction surface area to peripheral sidewall surface area ratio of 1.18:1.

Figure 48:
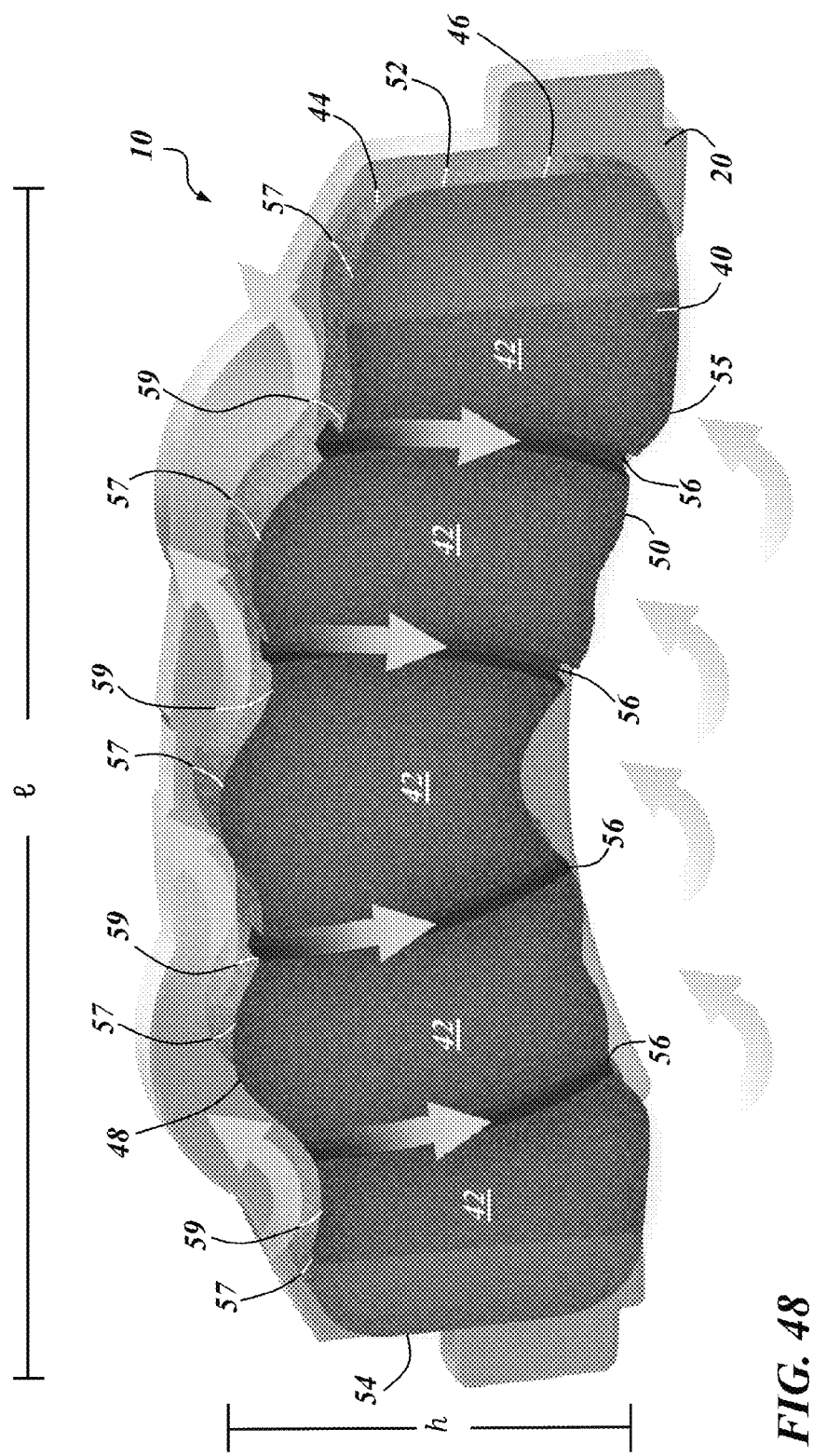

FIG. 48 shows a friction pad 40 which may have a length of 6.736 in. and a height of 1.782 in., and thus a corresponding length to height ratio (l:h) of 3.78:1. This particular friction pad has a more arcuate shape than other embodiments, and as such, care should be taken when determining the height. The area of the friction surface 42 may be 11.986 in.² and the length of the peripheral edge 46 may be 17.204 in., and the corresponding compactness is 0.0405. The complex edge region 55 of the friction pad 40 shown in FIG. 48 includes 3.5 undulations in the top peripheral edge 48, 4.5 undulations in the bottom edge 50, and half of an undulation in each side edge 52, 54 for a total of 9 undulations along its peripheral length 46. The same pad was designed without a complex edge region and no undulating edge, and the compactness was accordingly much higher (0.0473). The area of the peripheral sidewall 44 may be 6.356 in.², which results in a friction surface area to peripheral sidewall surface area ratio of 1.89:1. FIG. 48 also shows air flow patterns designated by block arrows, and as shown, features such as the complex edge profile 55 with wave crests 57 and wave troughs 59 as well as grooves 56 can alter the air flow pattern. This airflow pattern may promote cooling around each friction surface 42 of the friction pad 40.

Figure 49:
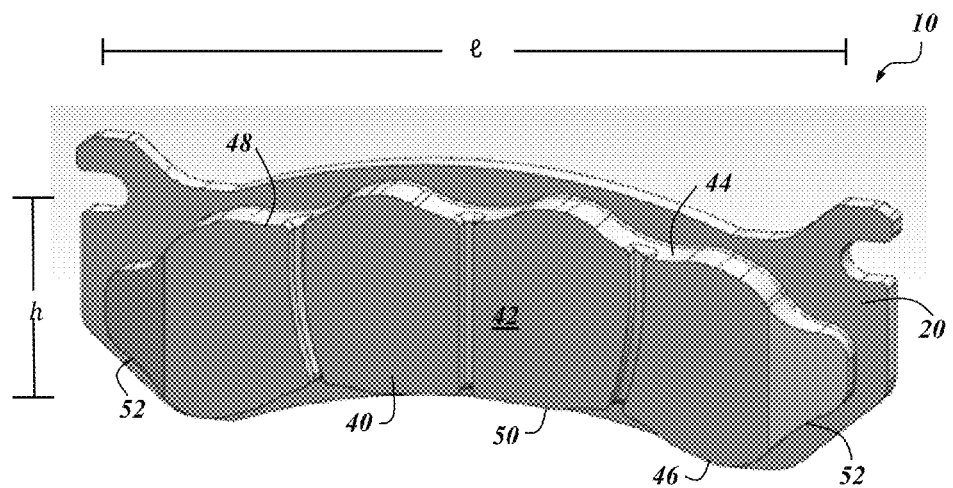

FIG. 49 shows a friction pad 40 which may have a length of 6.314 in. and a height of 1.631 in., and thus a corresponding length to height ratio (l:h) of 3.87:1. The area of the friction surface 42 may be 8.786 in.² and the length of the peripheral edge 46 may be 14.650 in., and the corresponding compactness is 0.0409. The complex edge region 55 of the friction pad 40 shown in FIG. 49 includes 4.5 undulations in the top peripheral edge 48, 2.5 undulations in the bottom edge 50, and 1 undulation in each side edge 52, 54 for a total of 9 undulations along its peripheral length 46. The same pad was designed without a complex edge region and no undulating edge, and the compactness was accordingly much higher (0.0435). The area of the peripheral sidewall 44 may be 6.020 in.², which results in a friction surface area to peripheral sidewall surface area ratio of 1.46:1.

Figure 50:
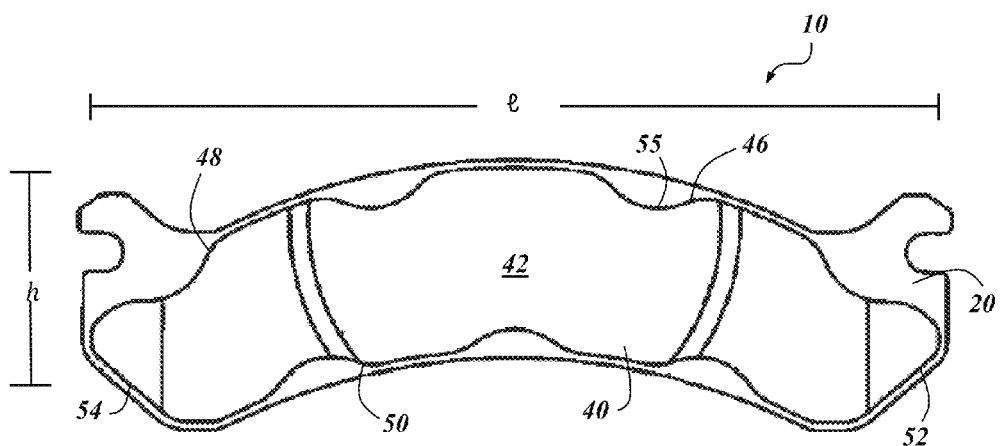
Figure 51:
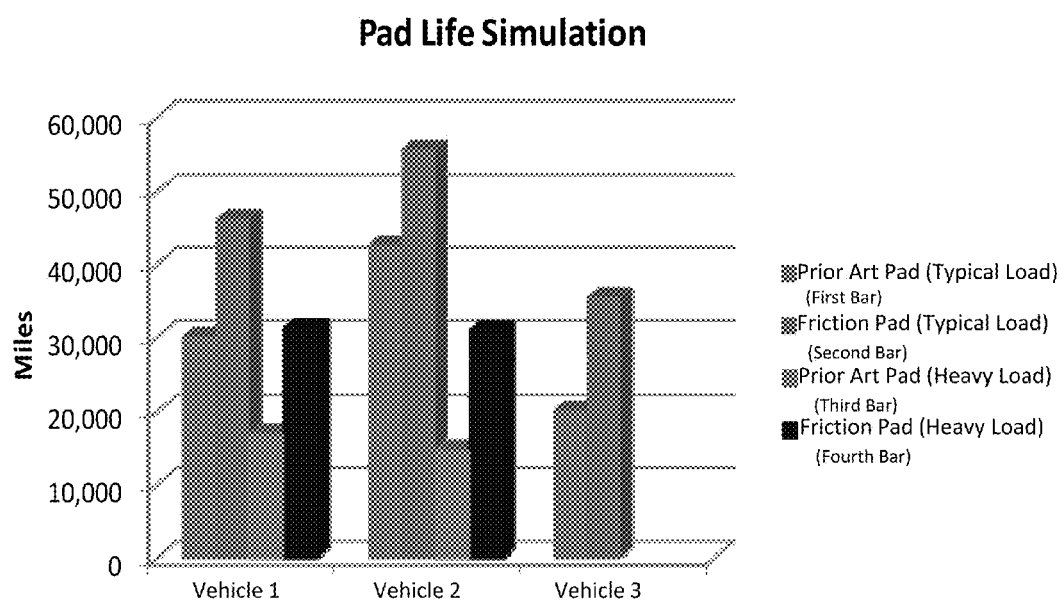
FIGS. 51-60C illustrate various simulated and actual test results that demonstrate the increased performance, or in some instances, at least comparable performance, of the friction pad of the present disclosure compared with various commercially-available prior art friction pads.
Figure 52:
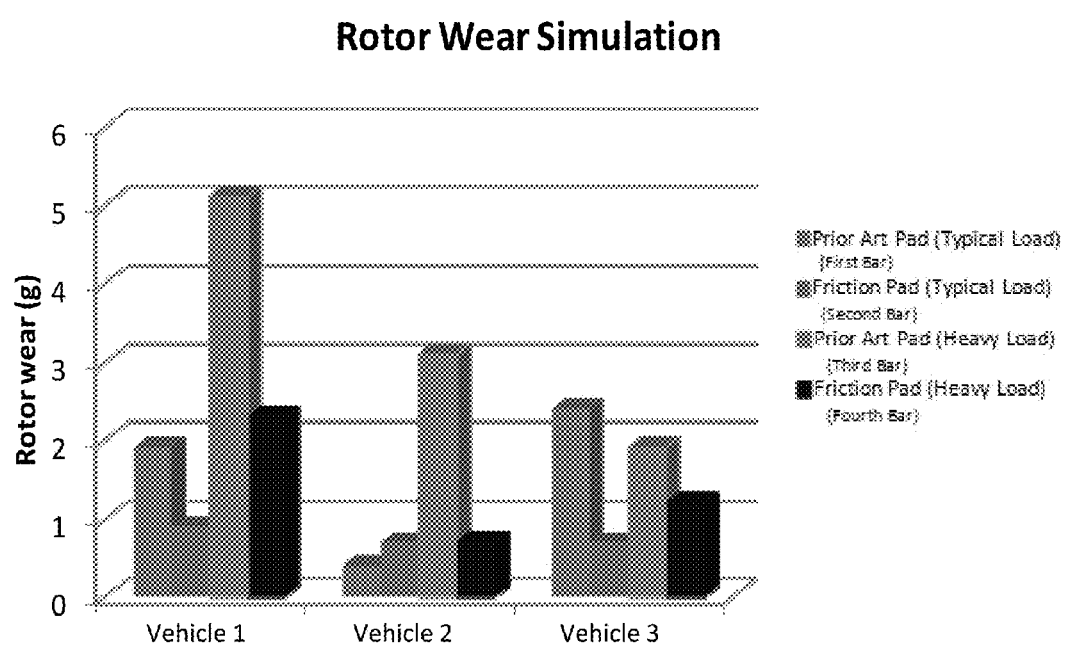
Figure 53:
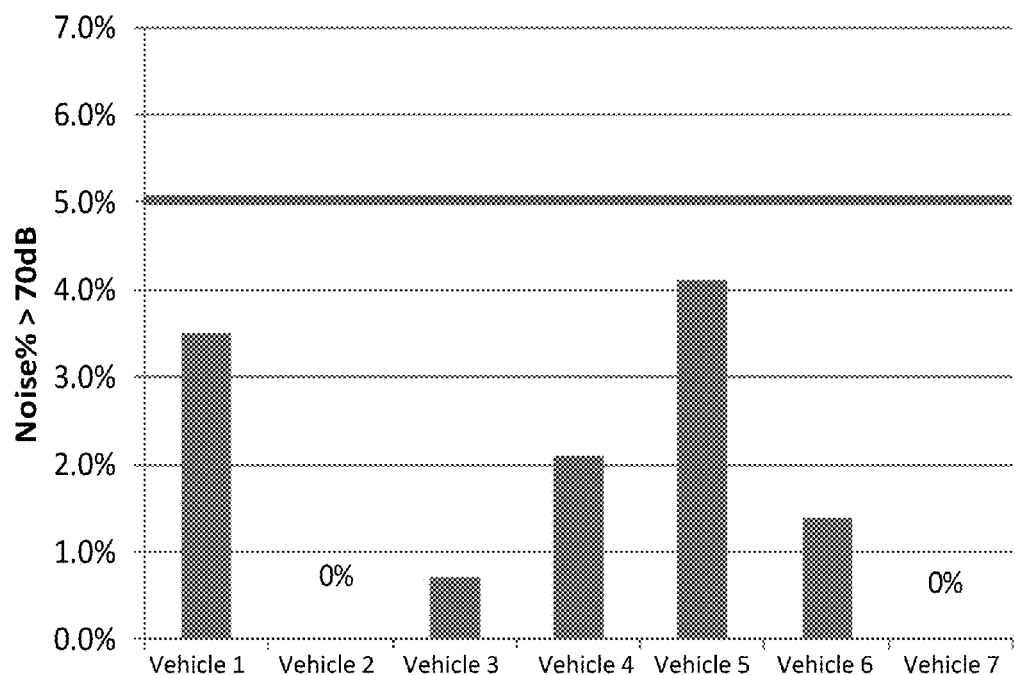
Figure 54:
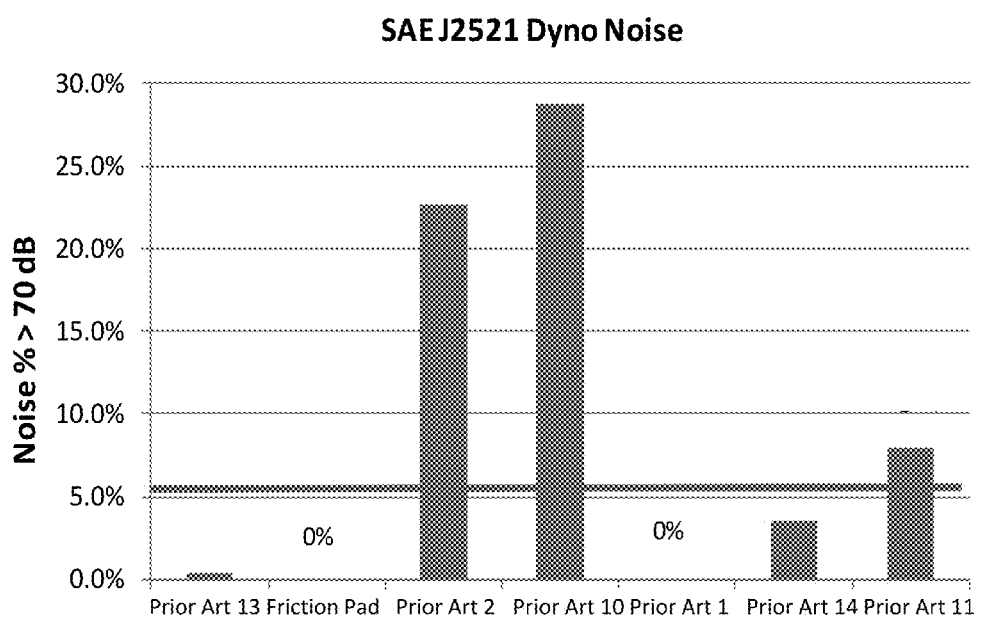
Figure 55:
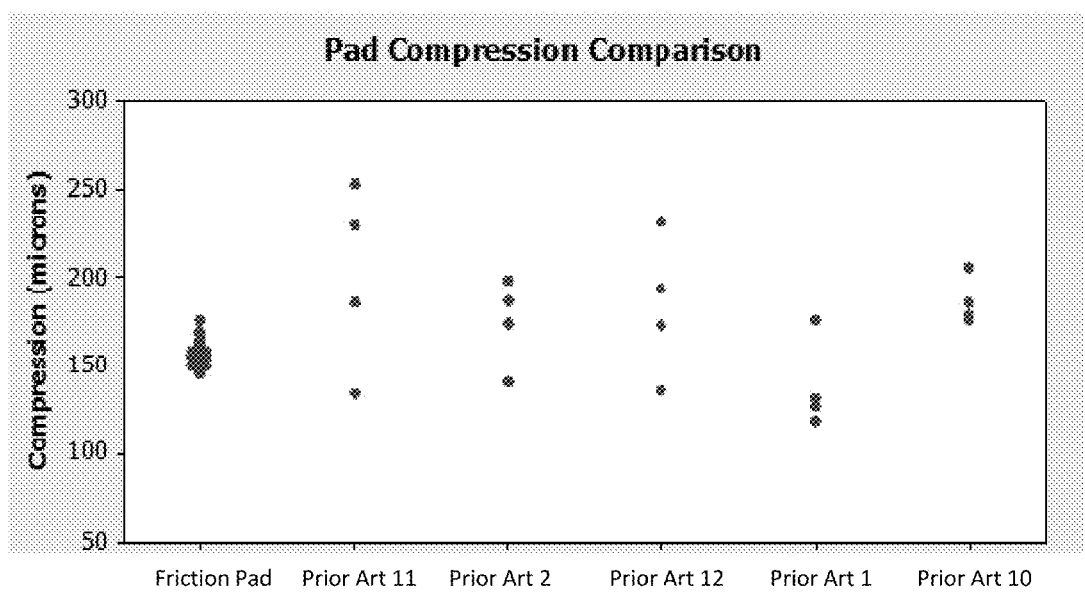
Figure 56A:
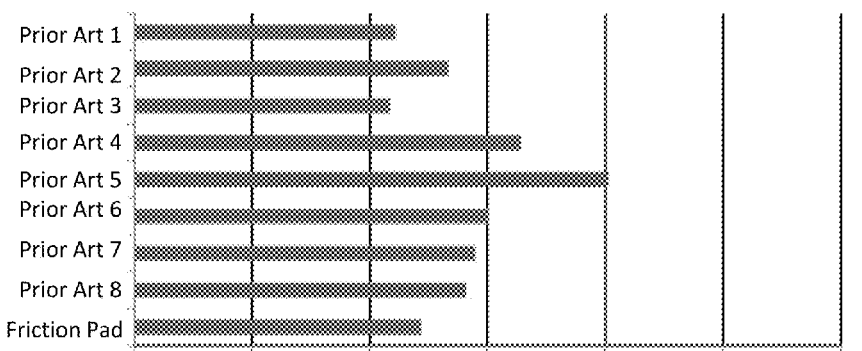
Figure 56B:
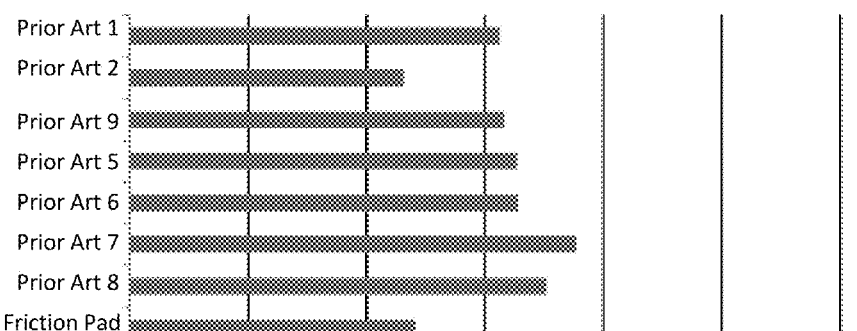
Figure 56C:
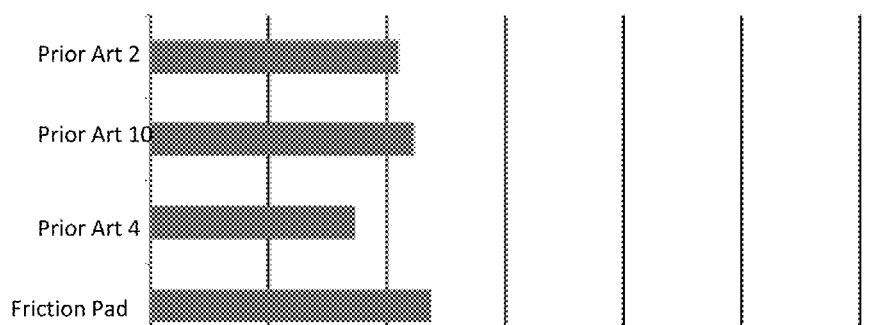
Figure 57A:
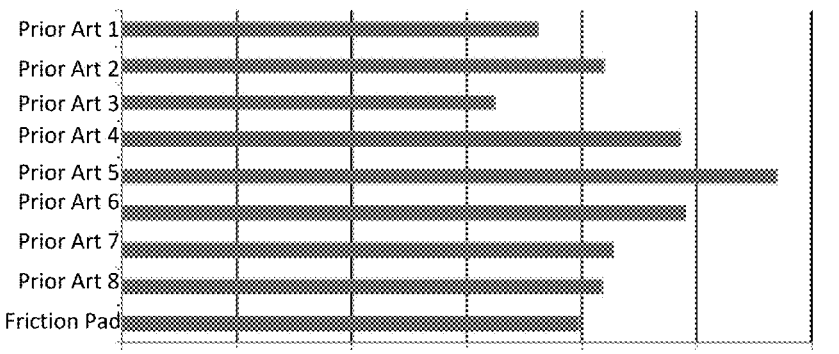
Figure 57B:
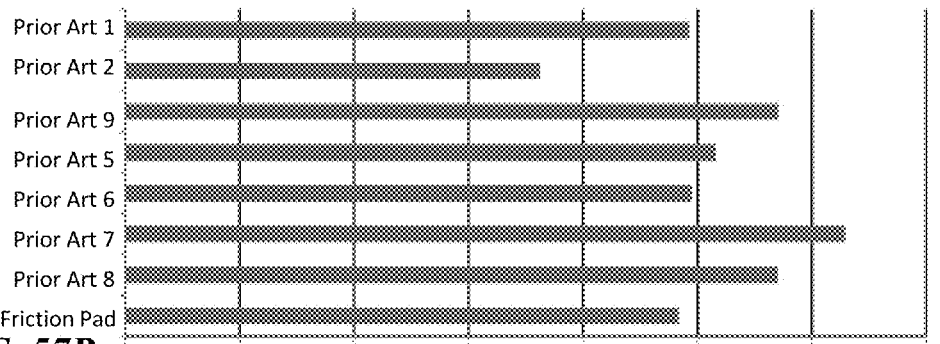
Figure 57C:
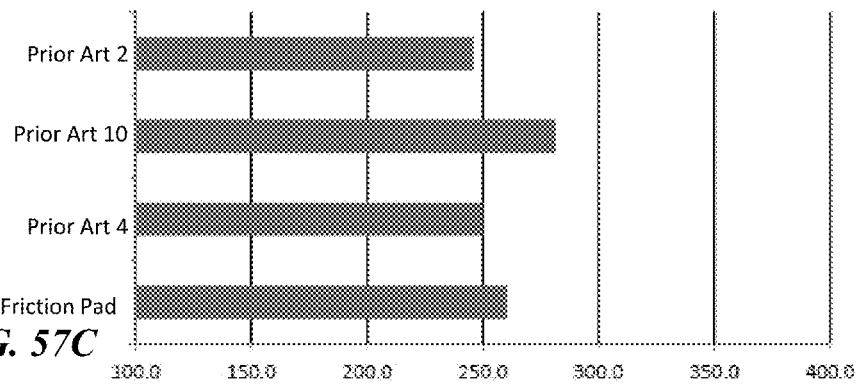
Figure 58A:
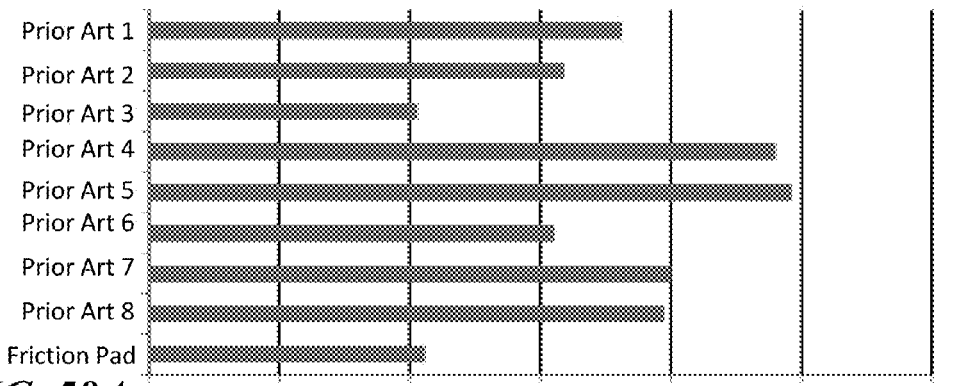
Figure 58B:
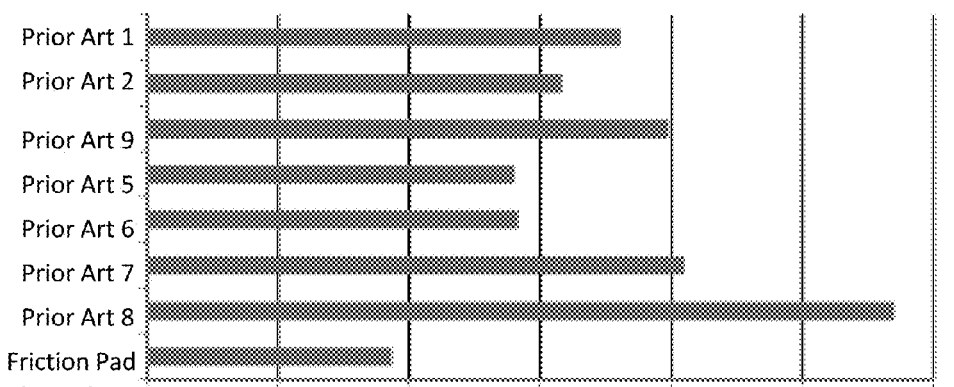
Figure 58C:
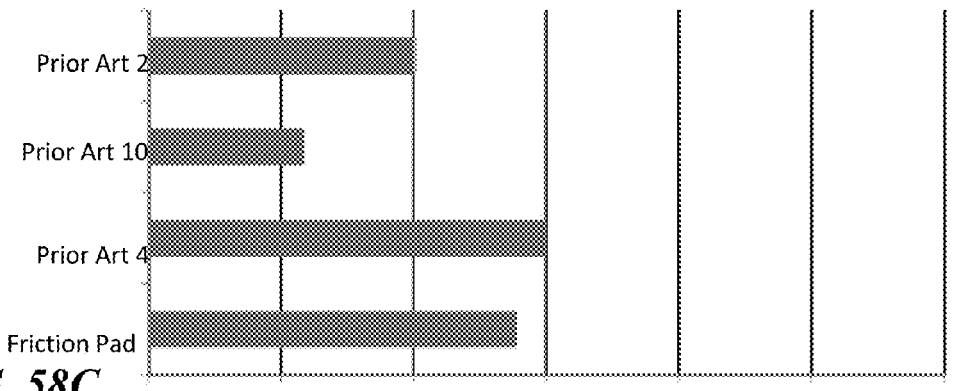
Figure 59A:
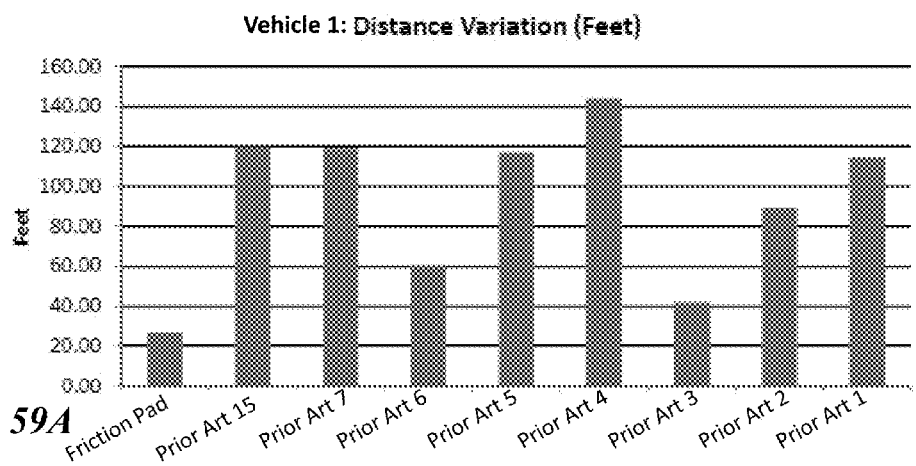
Figure 59B:
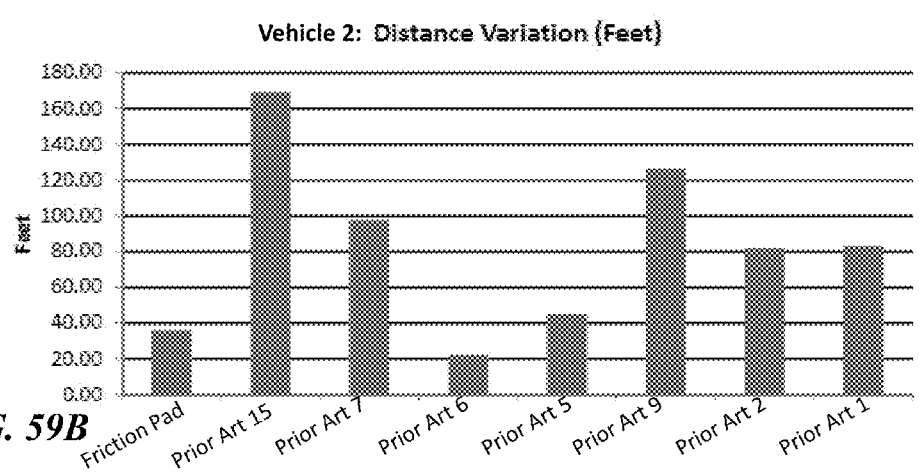
Figure 59C:
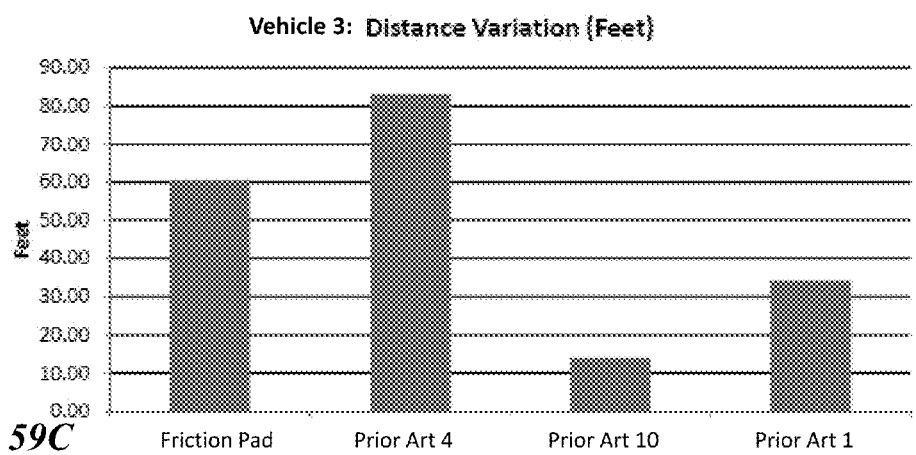
Figure 60A:
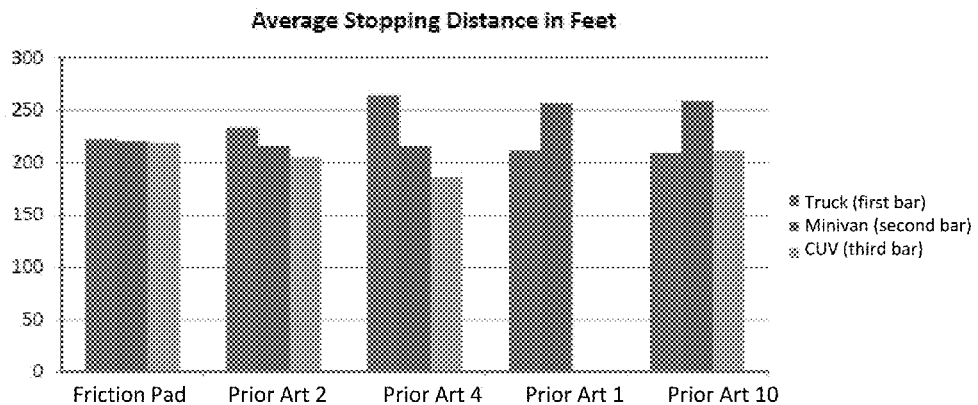
Figure 60B:
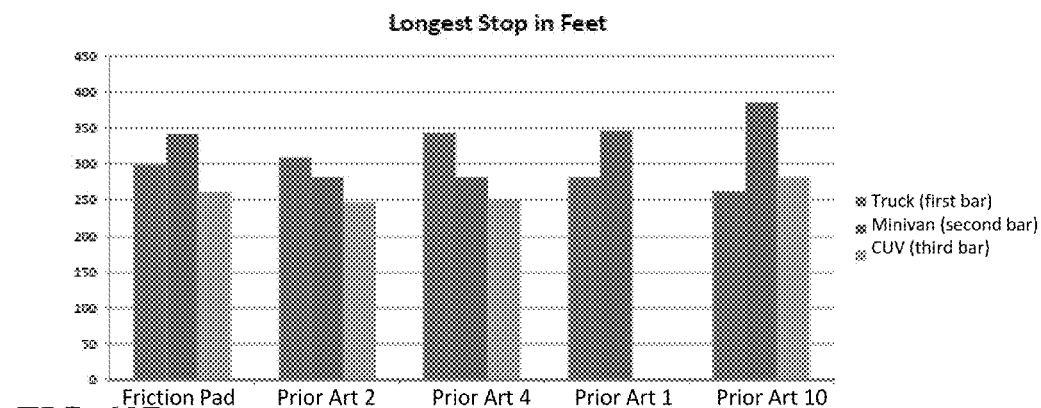
Figure 60C:
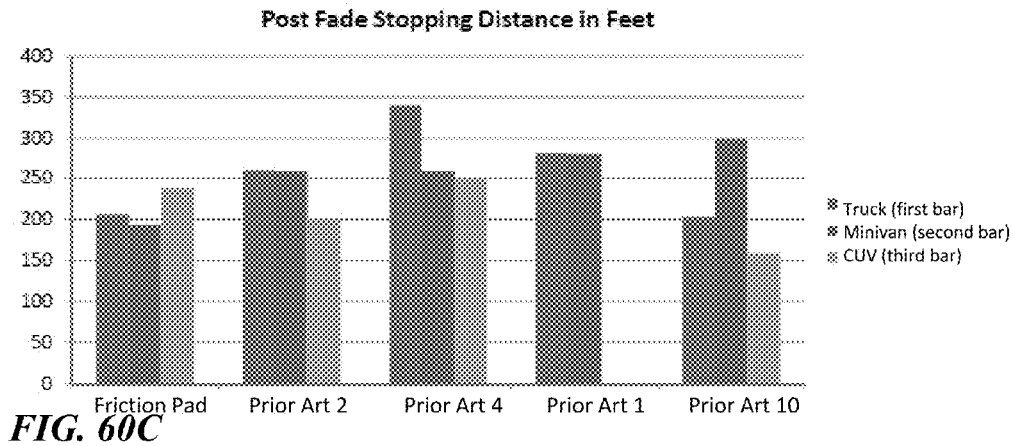

FIG. 50 shows a friction pad 40 which may have a length of 8.250 in. and a height of 1.947 in., and thus a corresponding length to height ratio (l:h) of 4.24:1. The area of the friction surface 42 may be 11.989 in.² and the length of the peripheral edge 46 may be 19.057 in., and the corresponding compactness is 0.0330. The complex edge region 55 of the friction pad 40 shown in FIG. 50 includes 3.5 undulations in the top peripheral edge 48, 2.5 undulations in the bottom edge 50, and half of an undulation in each side edge 52, 54 for a total of 7 undulations along its peripheral length 46. Although not illustrated in the figure, the area of the peripheral sidewall in this embodiment may be 7.268 in.², which results in a friction surface area to peripheral sidewall surface area ratio of 1.65:1.

For the elongated friction pads shown in FIGS. 44-50, the compactness ranges between 0.0330 and 0.0470, inclusive. In another embodiment, the elongated friction pads may have a compactness in a range from 0.0330 to 0.0452, inclusive. In yet another embodiment, the elongated friction pads may have a compactness in a range from 0.0380 to 0.0405, inclusive. The average compactness for the elongated friction pads is 0.0407, which, as expected, is much lower than the average compactness for similar elongated friction pads (0.0477). In total, for FIGS. 10-50, the ratio of the area of the friction surface to the area of the peripheral sidewall ranged between 1.18:1 and 2.49:1, inclusive. The number of undulations ranged between 4 and 13, inclusive, with more friction pads having between 7 and 9 undulations, inclusive. Finally, FIGS. 51-60C illustrate various simulated and actual test results that demonstrate the increased performance, or in some instances, at least comparable performance, of the friction pad 40 compared with various commercially-available prior art friction pads.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, although the illustrated embodiments disclose use of the friction pads with complex edge profiles on disk brake pads, it will be appreciated that those complex edge profile designs may be utilized on drum brake pads as well. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A brake pad, comprising:
   a backing plate; and
   a friction pad supported by the backing plate, the friction pad having a friction surface at least partially defined by a peripheral edge of the friction pad and having a continuous peripheral sidewall extending between the peripheral edge and the backing plate, wherein the peripheral edge comprises a plurality of peripheral side edges including a top peripheral side edge and a bottom peripheral side edge, wherein the top peripheral side edge and the bottom peripheral side edge both include a complex edge profile, each complex edge profile having a plurality of undulations with each undulation including a wave crest and a wave trough, and wherein the complex edge profile of the top peripheral side edge and the complex edge profile of the bottom peripheral side edge are each configured to direct airflow in a cooling pattern along the continuous peripheral sidewall in accordance with the wave crests and the wave troughs of the undulations of each complex edge profile during use of the friction pad, wherein the friction pad includes one or more grooves extending along the friction surface between one or more portions of the peripheral edge, wherein the one or more grooves are configured to direct airflow in a cooling pattern along the friction surface during use of the friction pad, and wherein the friction pad has a semi-elongated shape, an elongated shape, or a non-elongated shape in which either the top peripheral side edge, the bottom peripheral side edge, or both, being longer than another peripheral side edge.

2. The brake pad of claim 1, wherein each wave crest and each wave trough of each undulation extend within a plane of the friction surface toward and away from a periphery of the backing plate, respectively.

3. The brake pad of claim 2, wherein the backing plate includes a notch that corresponds in location with the wave crest or the wave trough of at least one of the undulations in one of the complex edge profiles of the peripheral edge of the friction surface.

4. The brake pad of claim 1, wherein the friction pad includes a curved groove that extends from a wave trough of one undulation to a wave trough of another undulation.

5. The brake pad of claim 1, wherein the friction pad includes a curved groove that extends from a wave crest of one undulation to a wave crest of another undulation.

6. The brake pad of claim 1, wherein the friction pad includes a curved groove that extends from a wave crest of one undulation to a wave trough of another undulation.

7. The brake pad of claim 1, wherein the friction surface further includes one or more chamfered surfaces.

8. The brake pad of claim 1, wherein the friction pad has the non-elongated shape and a compactness between 0.0479 and 0.0578, inclusive.

9. The brake pad of claim 1, wherein the friction pad has the semi-elongated shape and a compactness between 0.0394 and 0.0495, inclusive.

10. The brake pad of claim 1, wherein the friction pad has the elongated shape and a compactness between 0.0330 and 0.0470, inclusive.

11. The brake pad of claim 1, wherein a ratio of the area of the friction surface to the area of the peripheral sidewall is between 1.18:1 and 2.49:1, inclusive.

12. The brake pad of claim 1, wherein the peripheral edge of the friction pad comprises a complex edge profile that includes between 4 and 13 undulations, inclusive.

13. The brake pad of claim 12, wherein the complex edge profile includes between 7 and 9 undulations, inclusive.

14. A friction pad, comprising:
- a friction surface having a continuous peripheral edge including a top peripheral side edge, a bottom peripheral side edge, a left peripheral side edge and a right peripheral side edge that together form the continuous peripheral edge, wherein at least one of the top peripheral side edge or the bottom peripheral side edge is longer than either the left peripheral side edge or the right peripheral side edge;
- a complex edge profile on the top peripheral side edge of the friction surface, wherein the complex edge profile includes a plurality of undulations with each undulation including a wave crest and a wave trough; and
- one or more curved cooling grooves extending from the top peripheral side edge to the bottom peripheral side edge and curving at least partially toward the left peripheral side edge or the right peripheral side edge along the friction surface, wherein the complex edge profile of the top peripheral side edge is configured to direct airflow along the continuous peripheral edge and toward the cooling groove during use of the friction pad.

15. The friction pad of claim 14, wherein the left and right peripheral side edges each include at least a portion of one or more complex edge profiles, and one or more undulations of the left peripheral side edge mirror the one or more undulations of the right peripheral side edge.

16. The friction pad of claim 14, wherein the top peripheral side edge includes more undulations than any other peripheral side edge of the friction surface.

17. The friction pad of claim 14, wherein the bottom peripheral side edge includes at least a portion of a complex edge profile and the bottom peripheral side edge includes more undulations than any other peripheral side edge of the friction surface.

18. The friction pad of claim 14, wherein the cooling groove starts or terminates in a wave trough of the complex edge profile.

19. The friction pad of claim 14, wherein the bottom peripheral side edge includes a complex edge profile, and each of the complex edge profiles include a plurality of undulations with each undulation including a wave crest and a wave trough.

* * * * *